(12) United States Patent
Bisio

(10) Patent No.: US 11,178,994 B2
(45) Date of Patent: Nov. 23, 2021

(54) CAPSULE FOR PREPARING BEVERAGES

(71) Applicant: Bisio Progetti S.P.A., Alessandria (IT)

(72) Inventor: Stefano Bisio, Alessandria (IT)

(73) Assignee: Bisio Progetti S.P.A., Alessandria (IT)

( * ) Notice: Subject to any disclaimer, the term of this patent is extended or adjusted under 35 U.S.C. 154(b) by 496 days.

(21) Appl. No.: 16/010,858

(22) Filed: Jun. 18, 2018

(65) Prior Publication Data

US 2018/0296024 A1 Oct. 18, 2018

Related U.S. Application Data

(63) Continuation-in-part of application No. 14/435,018, filed as application No. PCT/IT2013/000279 on Oct. 10, 2013, now Pat. No. 10,000,335.

(30) Foreign Application Priority Data

Oct. 15, 2012 (IT) .......................... TO2012A000899

(51) Int. Cl.
| | | |
|---|---|---|
| *B65D 85/80* | (2006.01) | |
| *A47J 31/06* | (2006.01) | |
| *B65D 85/804* | (2006.01) | |
| *A47J 31/18* | (2006.01) | |
| *A47J 31/02* | (2006.01) | |

(52) U.S. Cl.
CPC ....... *A47J 31/0689* (2013.01); *A47J 31/0642* (2013.01); *B65D 85/8043* (2013.01); *A47J 31/02* (2013.01); *A47J 31/18* (2013.01)

(58) Field of Classification Search
CPC .............. B65D 85/8043; B65D 85/804; B65D 85/8046; A47J 31/02; A47J 31/0642; A47J 31/0689
See application file for complete search history.

(56) References Cited

U.S. PATENT DOCUMENTS

2010/0180775 A1* 7/2010 Kollep ............... B65D 85/8043
99/295

* cited by examiner

*Primary Examiner* — Ericson M Lachica
(74) *Attorney, Agent, or Firm* — Macheledt Bales LLP; Jennifer L. Bales

(57) ABSTRACT

A capsule for preparing beverages, in particular coffee, is described, comprising a containing body having a first portion, the containing body defining an internal volume adapted to contain a substance to be infused, the first portion being composed of: a first perimeter edge; a first central portion onto which at least one external pressing force is applied; a first crown portion collapsible towards inside the containing body under the action of the pressing force exerted at least on the first central portion and/or on the first crown portion, the first crown portion being interposed between the first perimeter edge and the first central portion, the first crown portion being connected on its perimeter to the first perimeter edge by interposing a first bending line and being connected to the first central portion by interposing a second bending line.

9 Claims, 31 Drawing Sheets

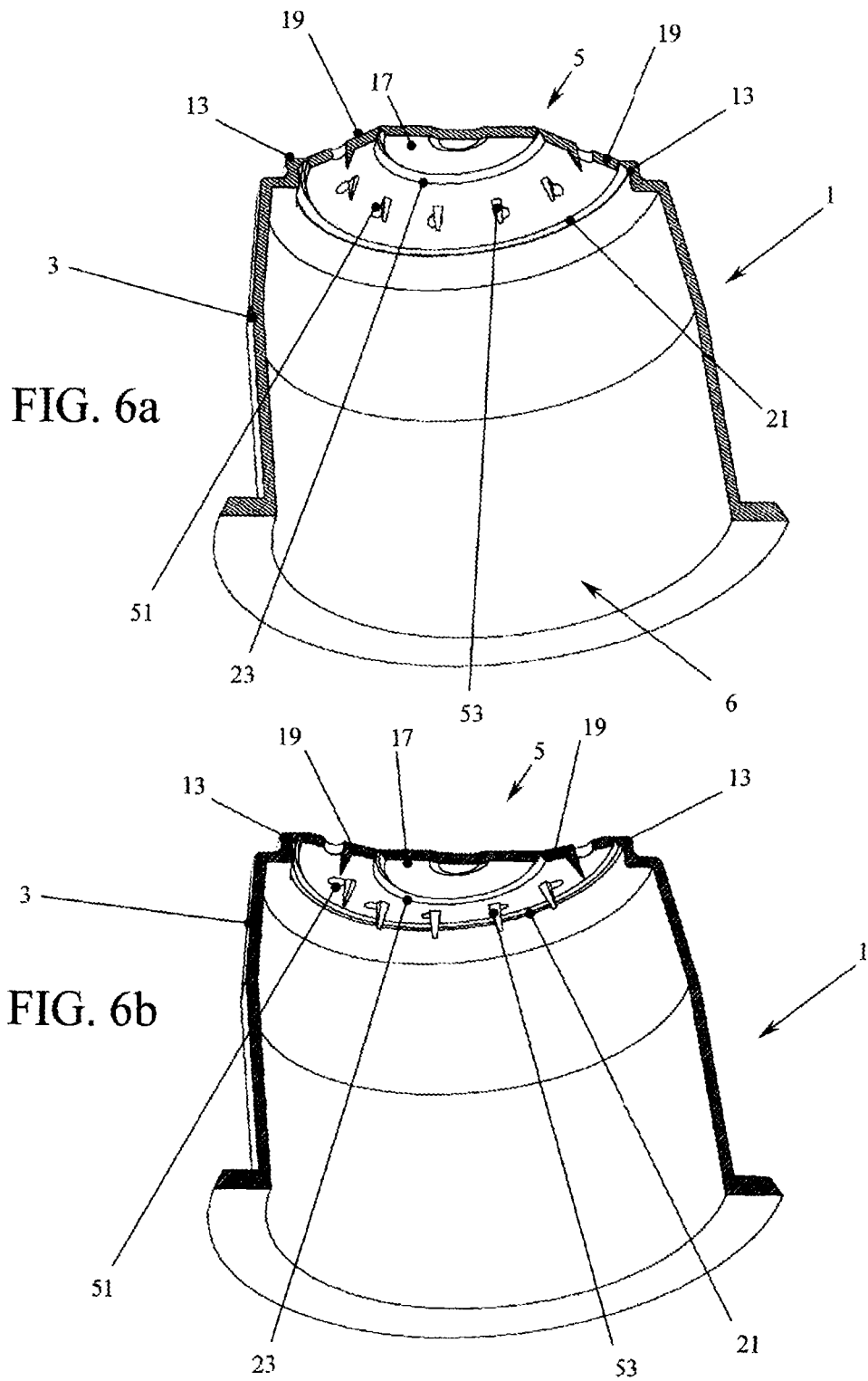

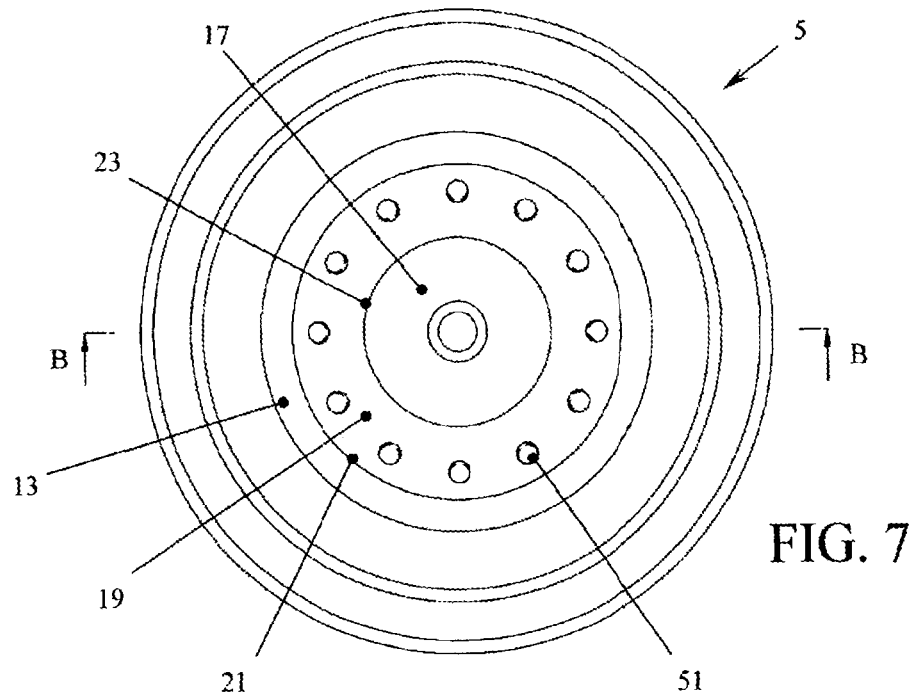
FIG. 7
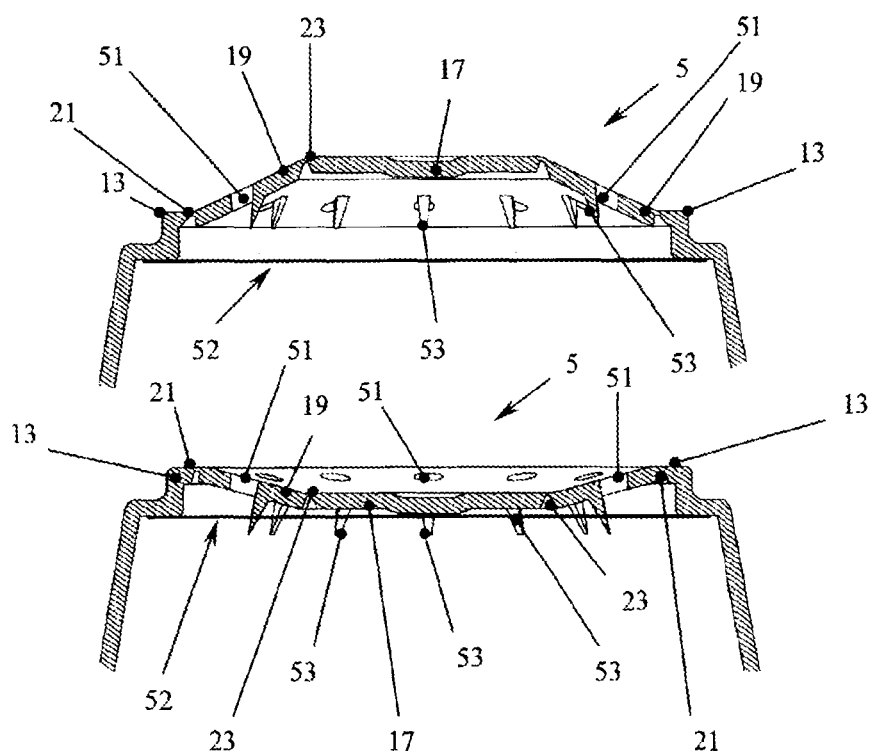
FIG. 8a
FIG. 8b

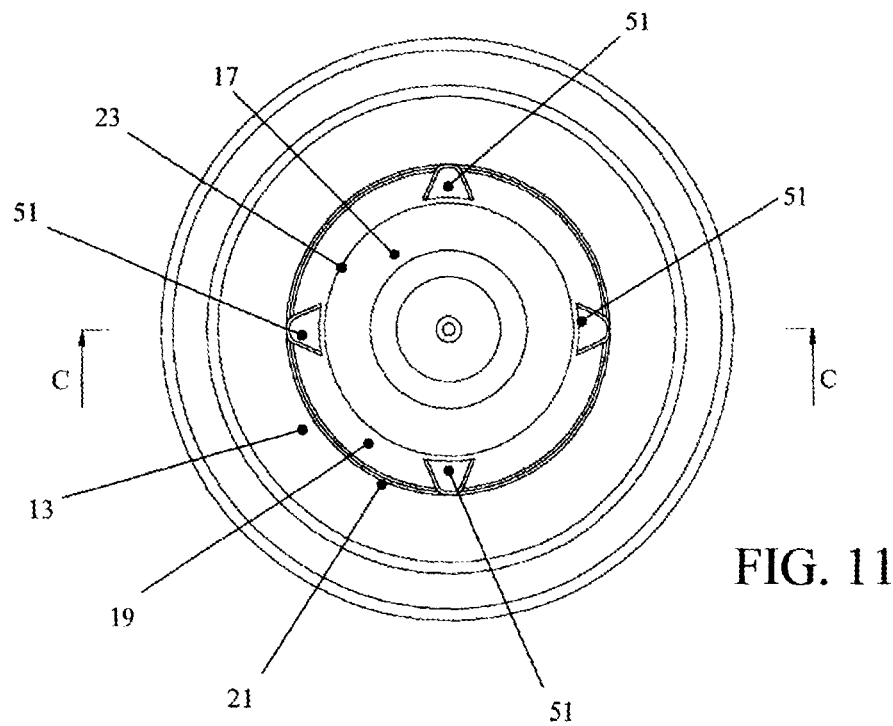
FIG. 11
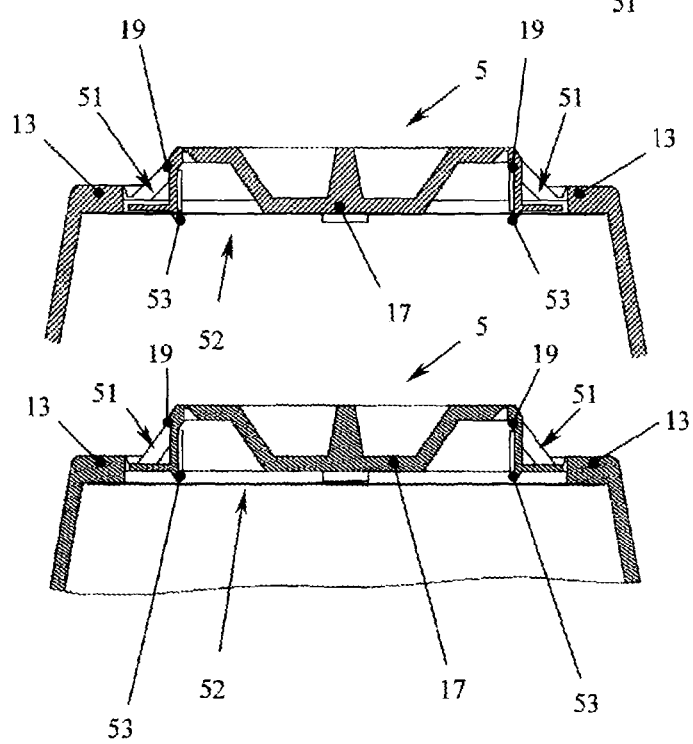
FIG. 12b
FIG. 12a

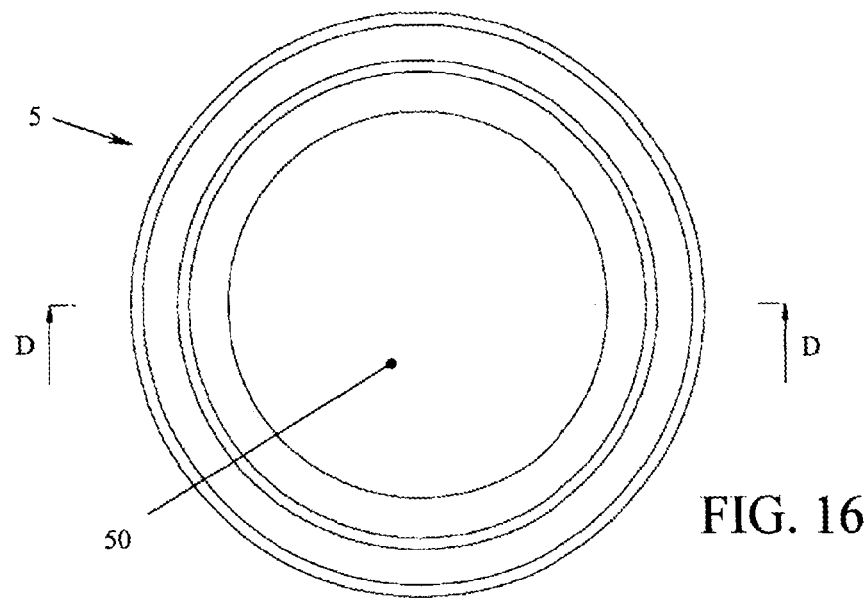
FIG. 16
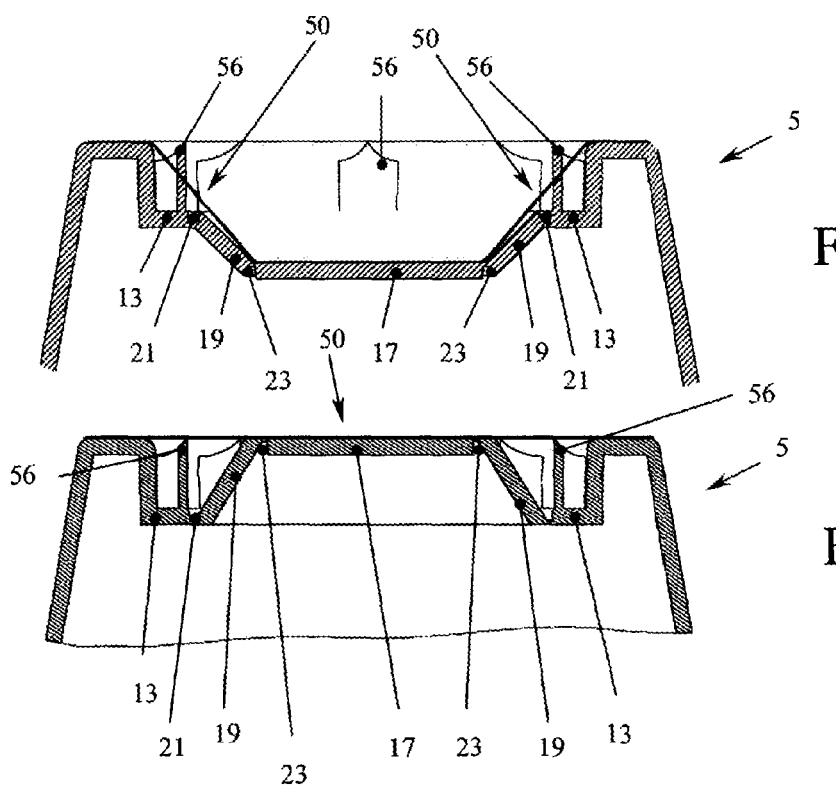
FIG. 17b
FIG. 17a

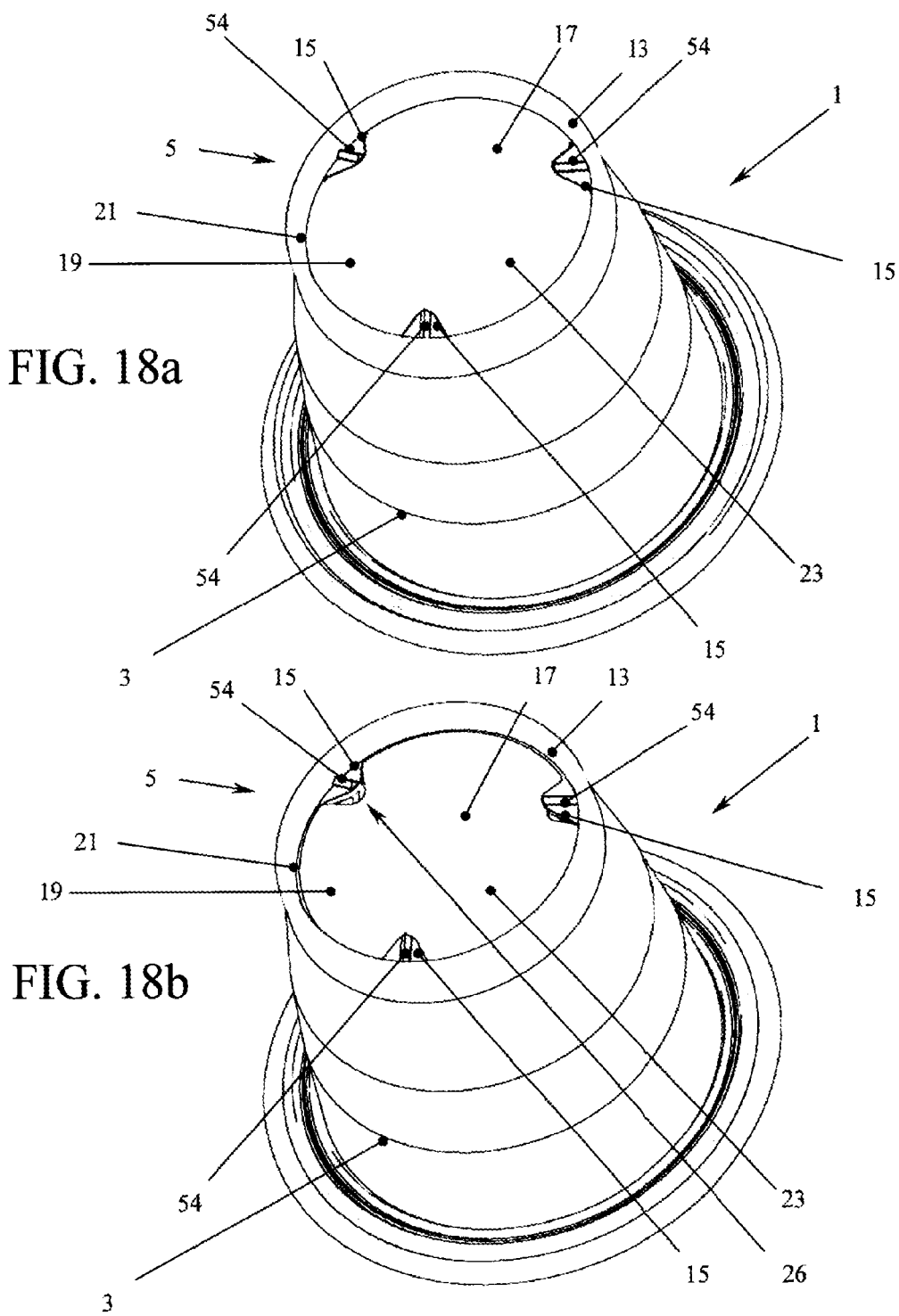

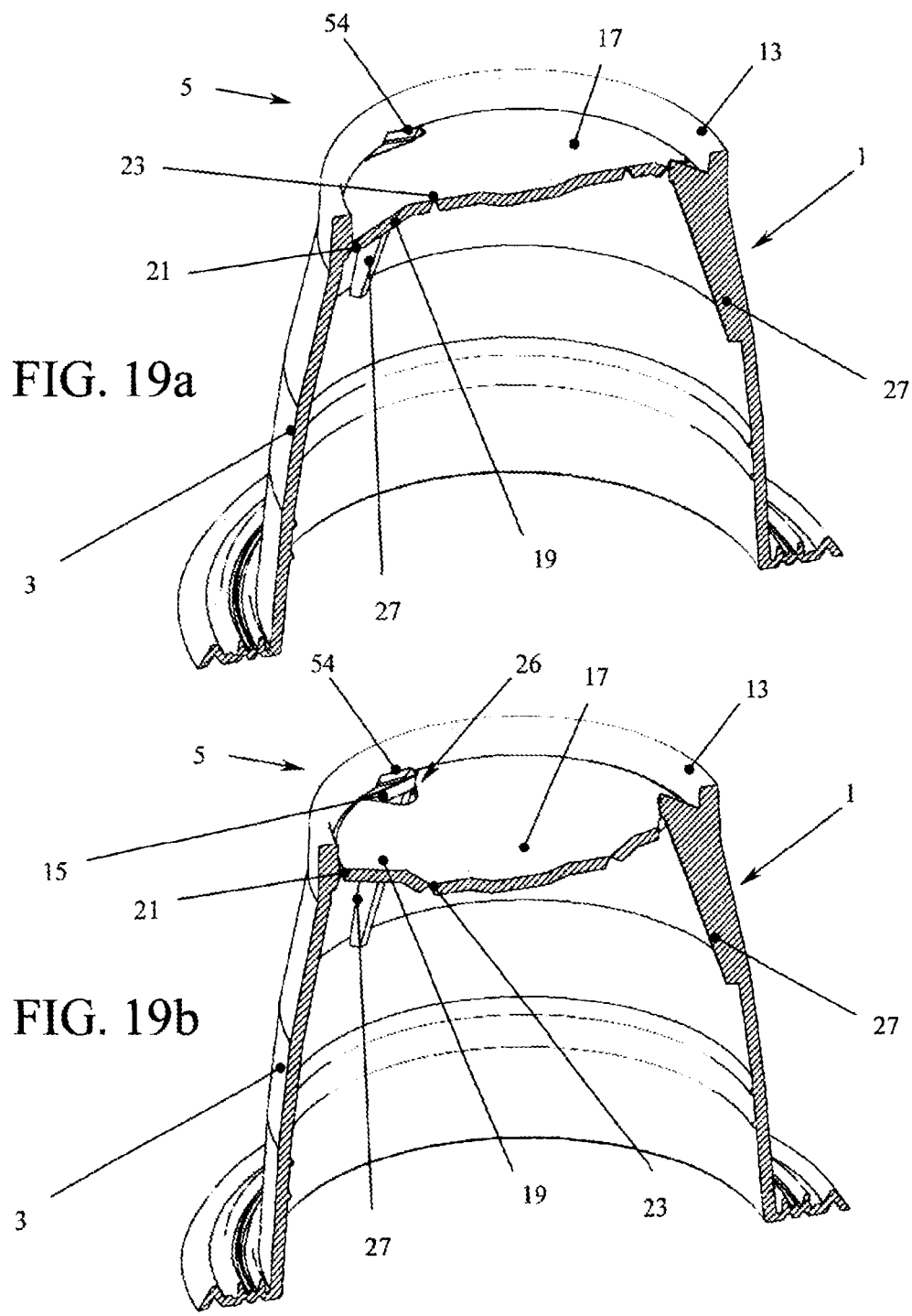

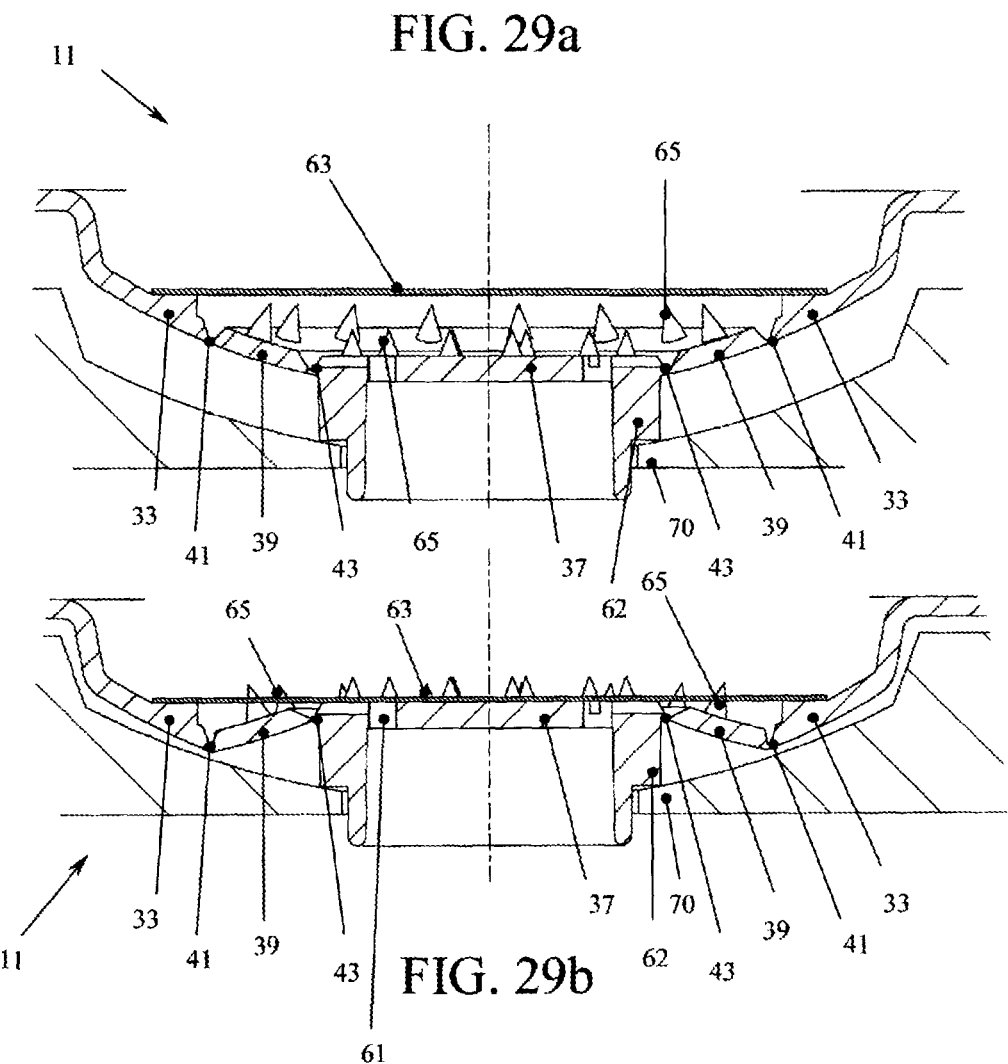

CAPSULE FOR PREPARING BEVERAGES

BACKGROUND OF THE INVENTION

1) Field of the Invention

The present invention refers to a capsule for preparing beverages.

2) Background Art

As known, the art proposes an extreme variety of automatic or semi-automatic machines equipped with a preparing and delivering unit adapted to produce an infusion by passing hot water through a capsule containing the essence to be infused, the as, for example, tea, coffee, tisanes, etc.

In particular, known capsules are with disposable pre-packaged doses of the substance to be infused enclosed inside a container made of plastic material closed by a covering made of plastic or an aluminium foil.

Moreover, there are different types of automatic or semi-automatic preparing machines for preparing beverages, in particular of the infusion type, each one of which using a different type of capsule: in general, however, the operating principle common to the machines provides for a perforation of the base and of the covering of the a capsule, thereby allowing a flow of hot water to cross the essence to be infused contained therein, the hot water being delivered by an infusing unit of the machine itself and being output as infusion beverage. Typically, therefore, the machines must be equipped with perforating and/or cutting means, usually integrated in the delivering head of the infusing unit, enough pointed and/or sharpened as to perforate and/or tear the base and the covering of the capsule: obviously, to allow a reliable operation in time of the machines, the perforating and/or cutting means must guarantee their efficiency even after a relevant number of uses; it has however been observed that actually the means, in time, are subjected to wear with chamfering and at the same time to a loss of efficiency in the work of perforation and/or tearing of the capsule, consequently causing a bad operation of the related machine for preparing the infusion beverage.

Therefore, object of the present invention is solving the above prior art problems by providing a capsule for preparing beverages, in particular coffee, which does not necessarily require the use of a preparing machine equipped with perforating and/or tearing means to allow the water flow to cross the capsule itself.

SUMMARY OF THE INVENTION

The above and other objects and advantages of the invention, as will result from the following description, are obtained by a capsule for preparing beverages as claimed in claim 1. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) could be made to what is described, without departing from the scope of the invention, as appears from the enclosed claims.

The present invention will be better described by some preferred embodiments thereof, provided as a non-limiting example, with reference to the enclosed drawings, in which:

BRIEF DESCRIPTION OF THE DRAWINGS

FIG. 6a shows a bottom, longitudinally sectioned, perspective view of the capsule of the present invention in the closed operating position of FIG. 5a;

FIG. 6b shows a bottom, longitudinally sectioned, perspective view of the capsule of the present invention in the closed operating position of FIG. 5b;

FIG. 7 shows a bottom plan view of the capsule of the present invention in FIGS. 5a and 5b;

FIG. 8a shows a view along section line B-B of FIG. 7 of the first portion of the capsule of the present invention in a closed operating position;

FIG. 8b shows a vista along section line B-B of the FIG. 7 of the first portion of the capsule of the present invention in a delivering operating position;

FIG. 10 shows a perspective and longitudinally sectioned view of the capsule of the present invention partially disassembled in its closed operating position of FIG. 9a;

FIG. 11 shows a bottom plan view of the capsule of the present invention of FIGS. 9a and 9b;

FIG. 12a shows a view along section line C-C of FIG. 11 of the first portion of the capsule of the present invention in a closed operating position;

FIG. 12b shows a view along section line C-C of FIG. 11 of the first portion of the capsule of the present invention in a delivering operating position;

FIG. 14a shows a perspective and longitudinally sectioned view of the capsule of the present invention in the closed operating position of FIG. 13a;

FIG. 16 shows a bottom plan view of the capsule of the present invention in FIGS. 15a and 15b;

FIG. 17a shows a view along section line D-D of FIG. 16 of the first portion of the capsule of the present invention in a closed operating position;

FIG. 17b shows a view along section line D-D of FIG. 16 of the first portion of the capsule of the present invention in a delivering operating position;

FIG. 18a shows a bottom perspective view of another preferred embodiment of the capsule of the present invention partially disassembled with the first portion in a closed operating position;

FIG. 18b shows a bottom perspective view of the capsule of FIG. 18a of the present invention partially disassembled with its first portion in a delivering operating position;

FIG. 19a shows a perspective and longitudinally sectioned view of the capsule of the present invention in the closed operating position of FIG. 18a;

FIG. 19b shows a perspective and longitudinally sectioned view of the capsule of the present invention in the delivering operating position of FIG. 18b

FIG. 29a shows a cross sectional view of the second portion of the capsule of FIG. 27 in the closed operating position;

FIG. 29b shows a cross sectional view of the second portion of the capsule of FIG. 27 in the delivering operating position;

FIG. 32b shows a perspective longitudinally sectioned view of the capsule of FIG. 32a;

FIG. 33b shows a perspective longitudinally sectioned view of the capsule of FIG. 33a;

FIG. 34b shows a perspective longitudinally sectioned view of the capsule of FIG. 34a;

DETAILED DESCRIPTION OF PREFERRED EMBODIMENTS

Figures 1A, 1B:
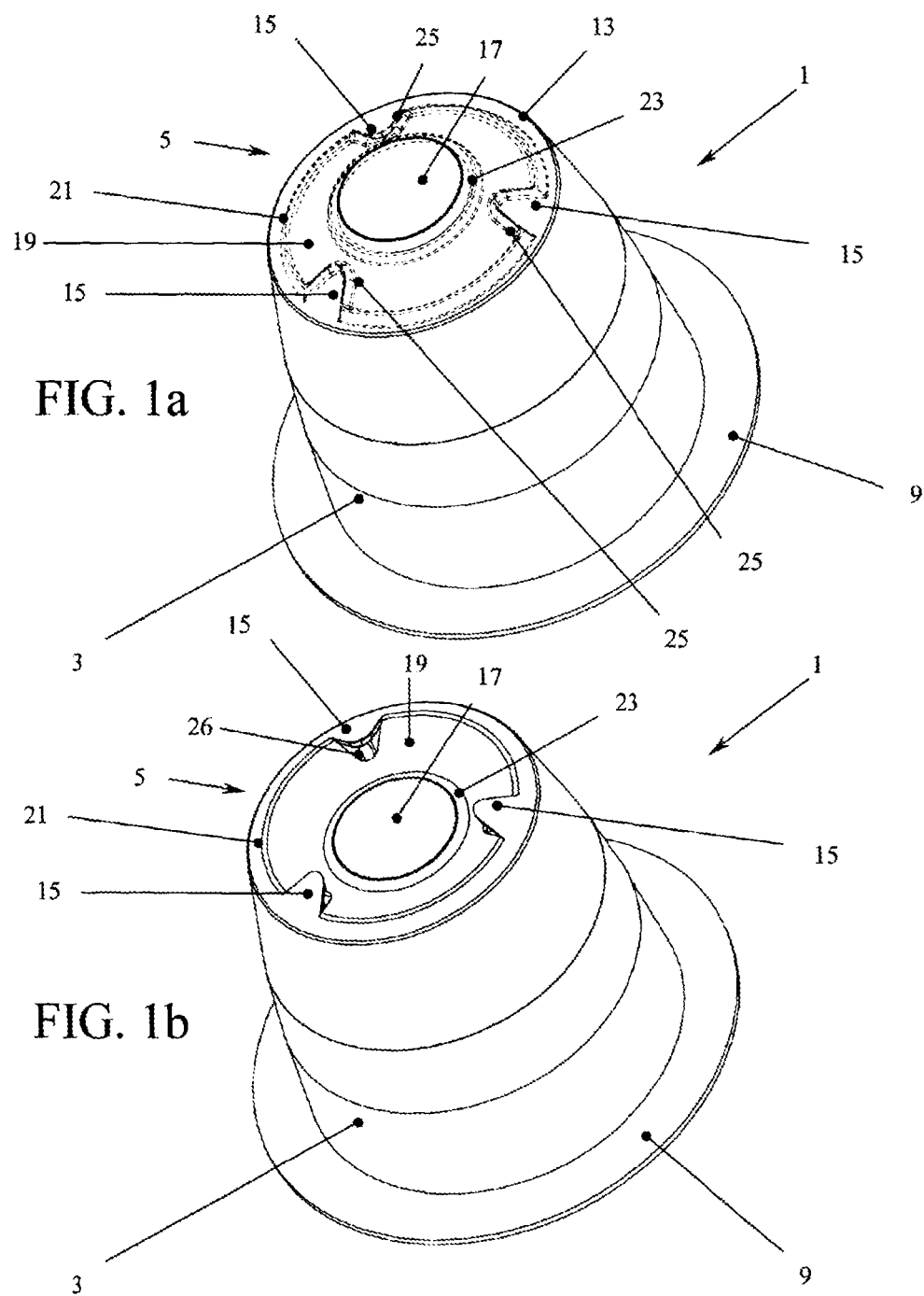
FIG. 1a shows a bottom perspective view of a preferred embodiment of the capsule according to the present invention with its first portion in a closed operating position.
FIG. 1b shows a bottom perspective view of a preferred embodiment of the capsule of the present invention with its first portion in a delivering operating position.
Figure 2:
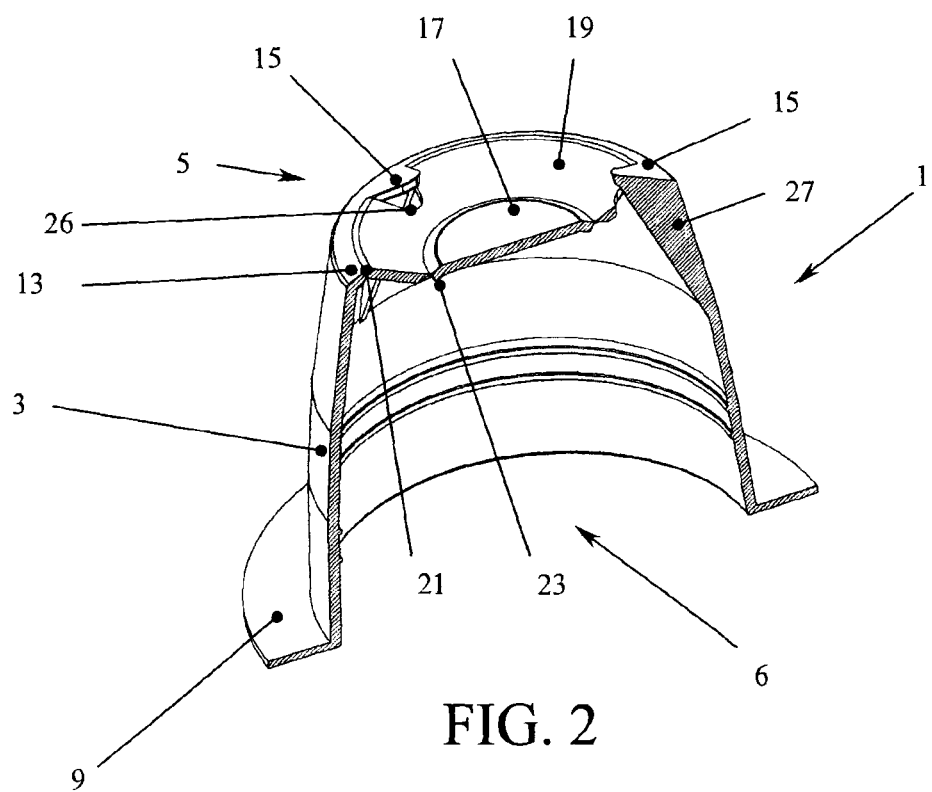
FIG. 2 shows a perspective longitudinally sectioned view of the capsule of FIG. 1b.
Figure 3:
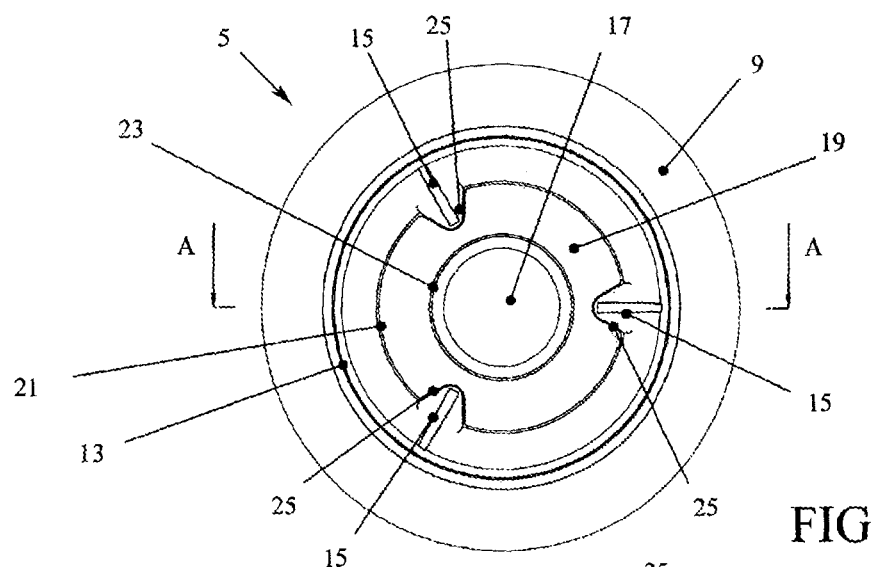
FIG. 3 shows a bottom plan view of the capsule of the present invention.
Figure 4A:
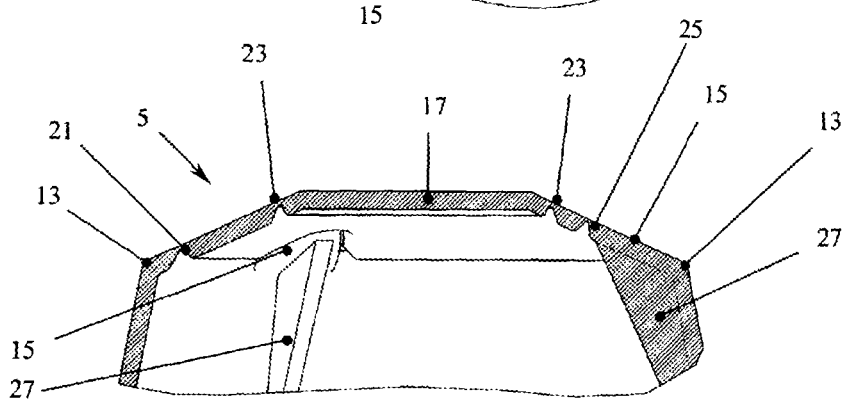
FIG. 4a shows a view along section line A-A of FIG. 3 of the first portion of the capsule of the present invention in a closed operating position.
Figure 4B:
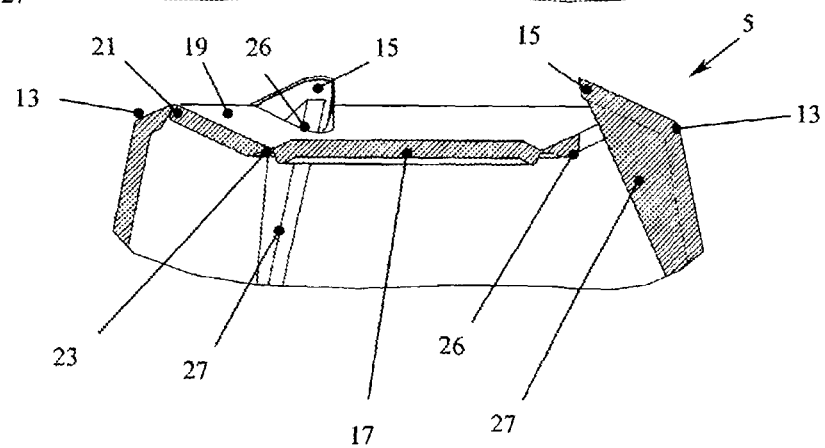
FIG. 4b shows a view along section line A-A of FIG. 3 of the first portion of the capsule of the present invention in a delivering operating position.
Figure 5A:
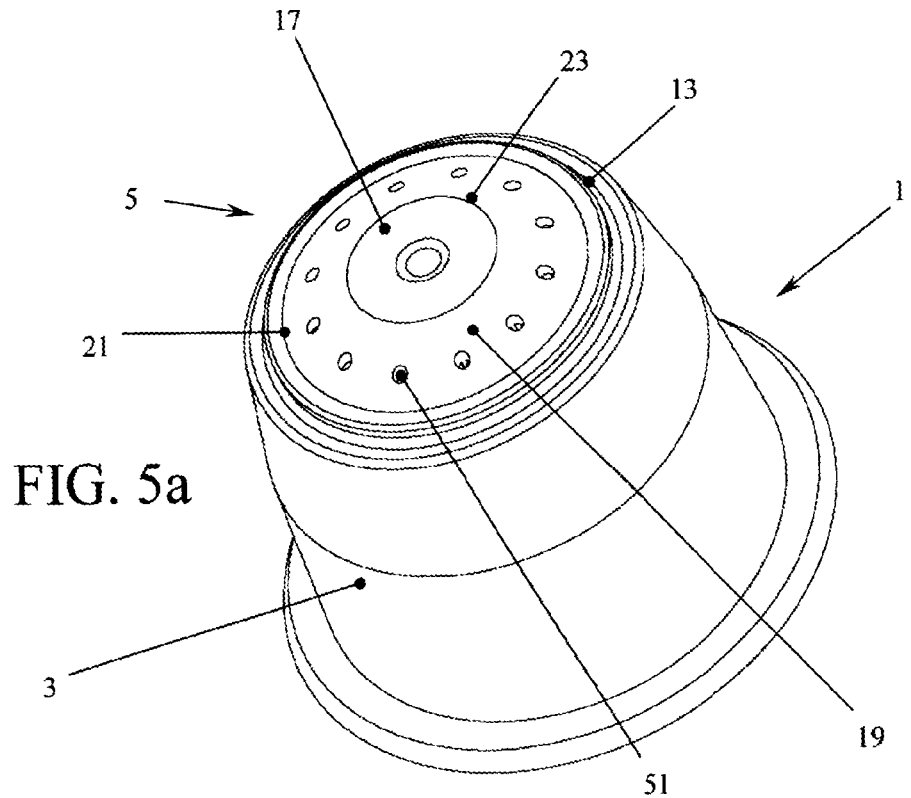
FIG. 5a shows a bottom perspective view of another preferred embodiment of the capsule of the present invention with its first portion in a closed operating position.
Figure 5B:
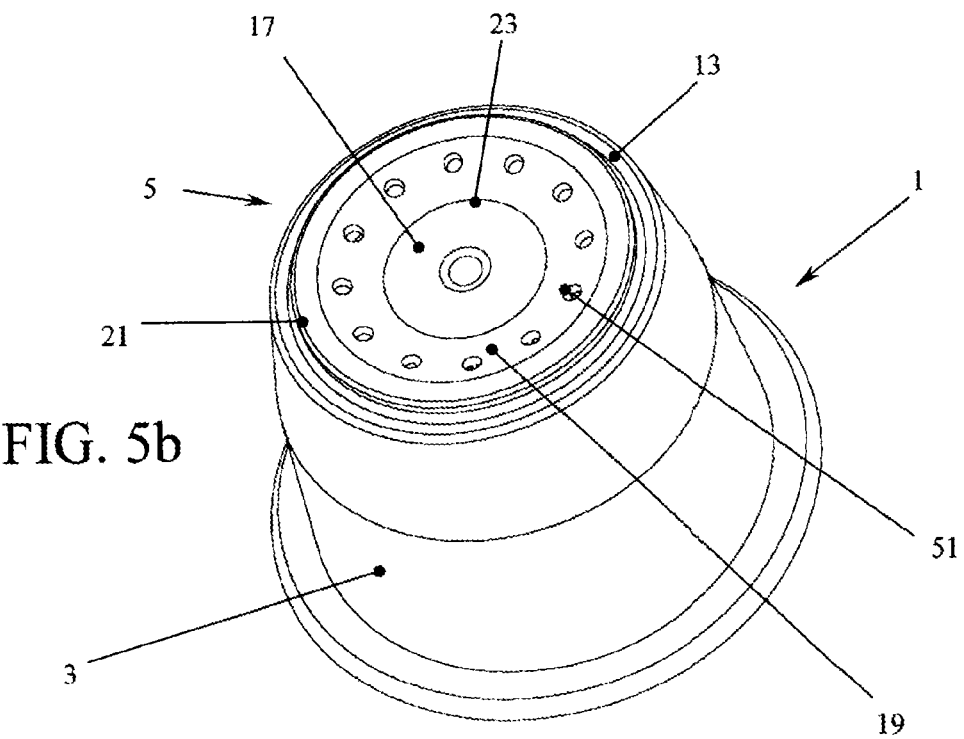
FIG. 5b shows a bottom perspective view of the capsule of FIG. 5a of the present invention with its first portion in a delivering operating position.
Figure 9A:
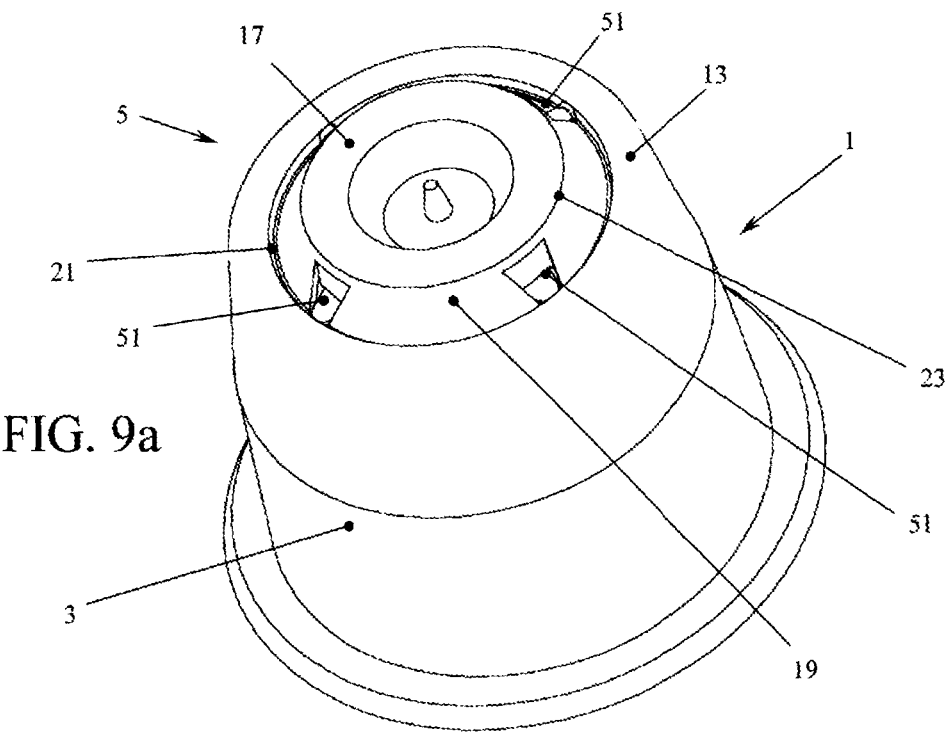
FIG. 9a shows a bottom perspective view of another preferred embodiment of the capsule of the present invention with its first portion in a closed operating position.
Figure 9B:
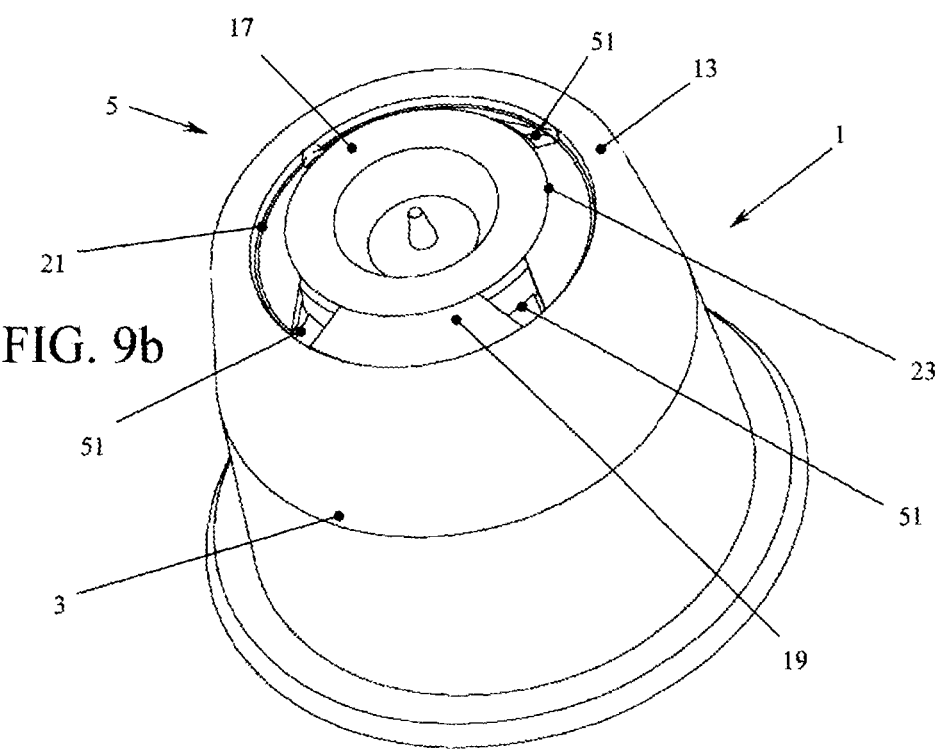
FIG. 9b shows a bottom perspective view of the capsule of FIG. 9a of the present invention with its first portion in a delivering operating position.
Figure 10:
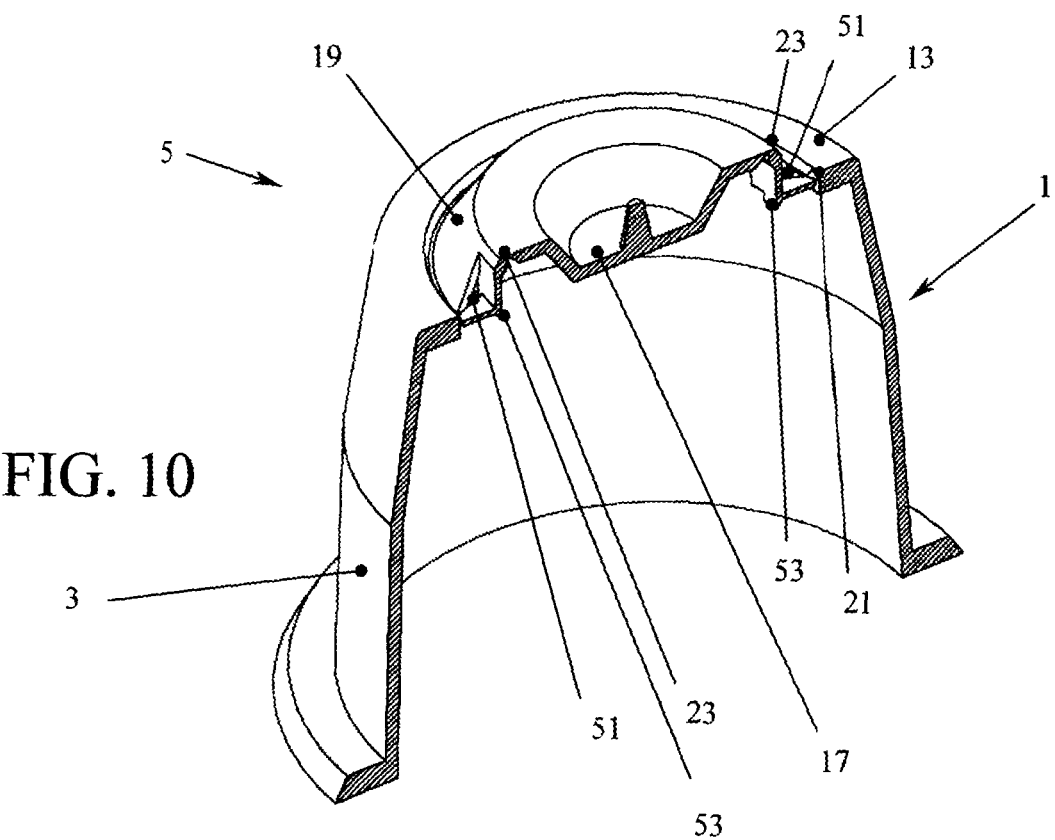
Figure 13A:
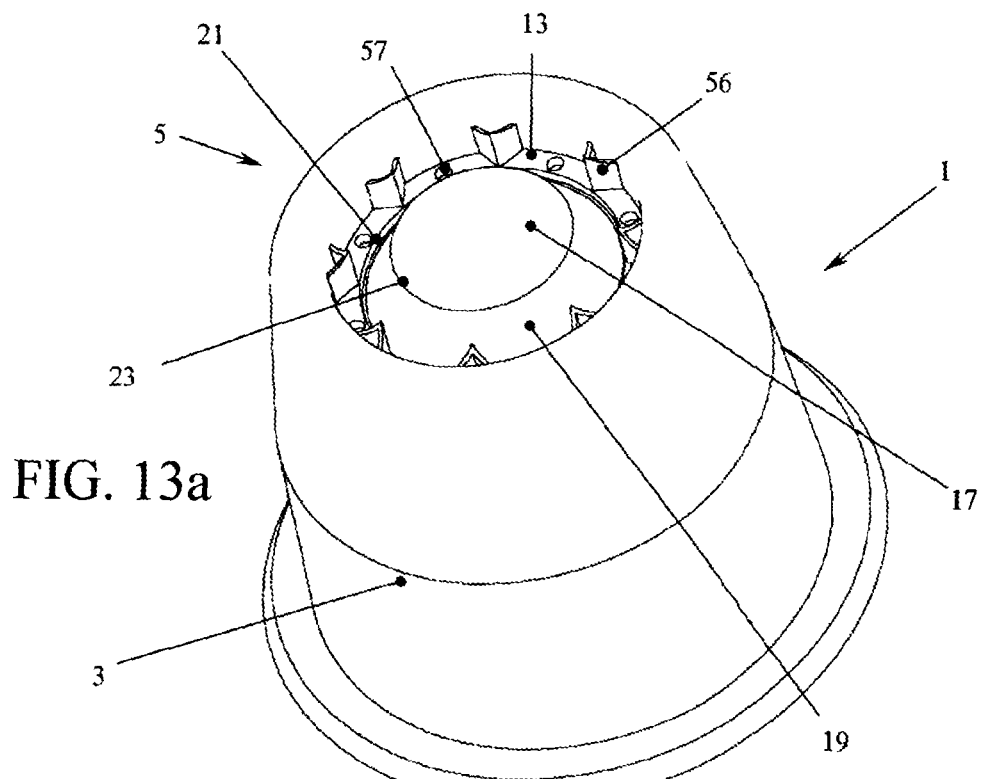
FIG. 13a shows a bottom perspective view of another preferred embodiment of the capsule of the present invention partially disassembled with its first portion in a closed operating position.
Figure 13B:
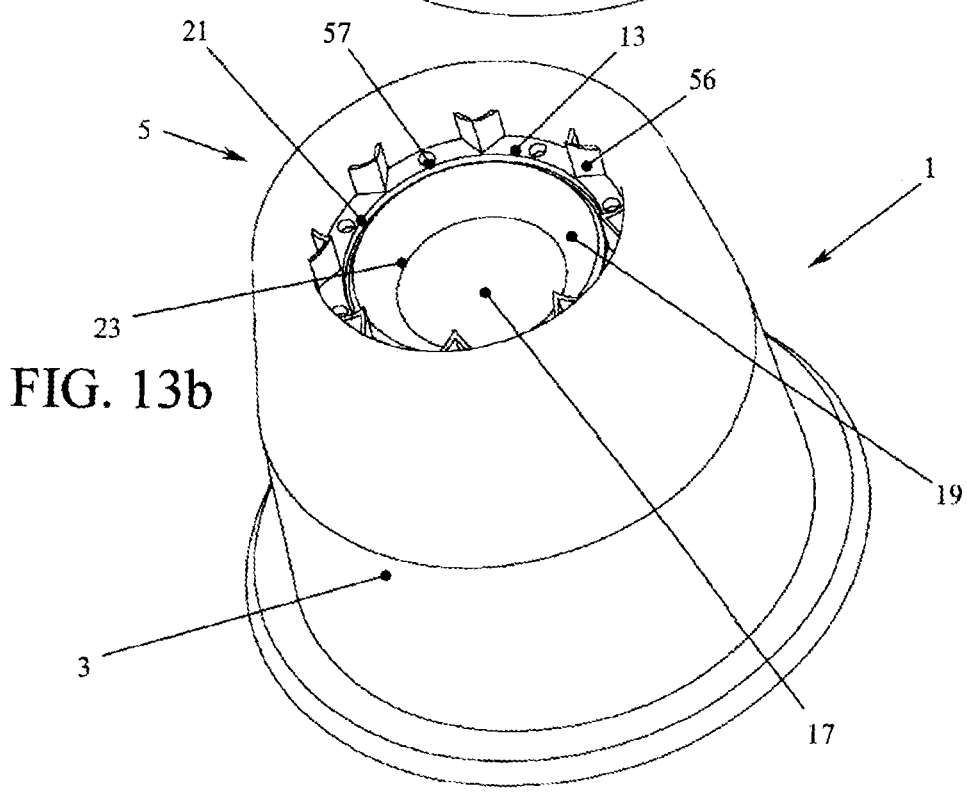
FIG. 13b shows a bottom perspective view of the capsule of FIG. 13a of the present invention partially disassembled with its first portion in a delivering operating position.
Figure 14A:
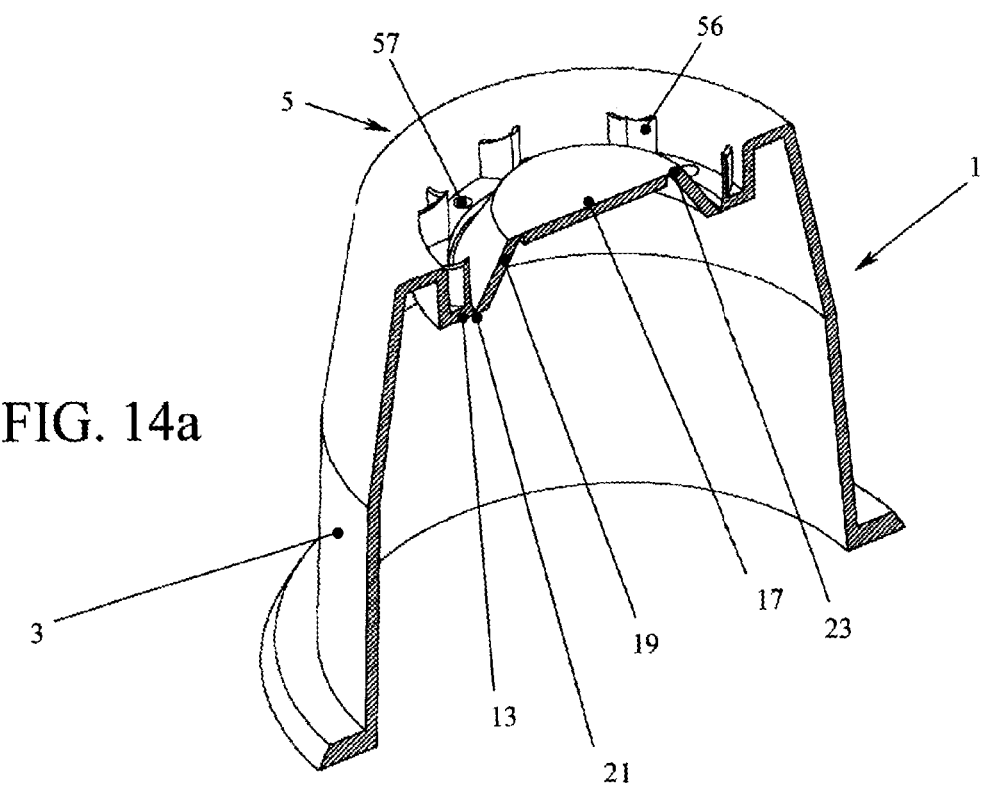
Figure 14B:
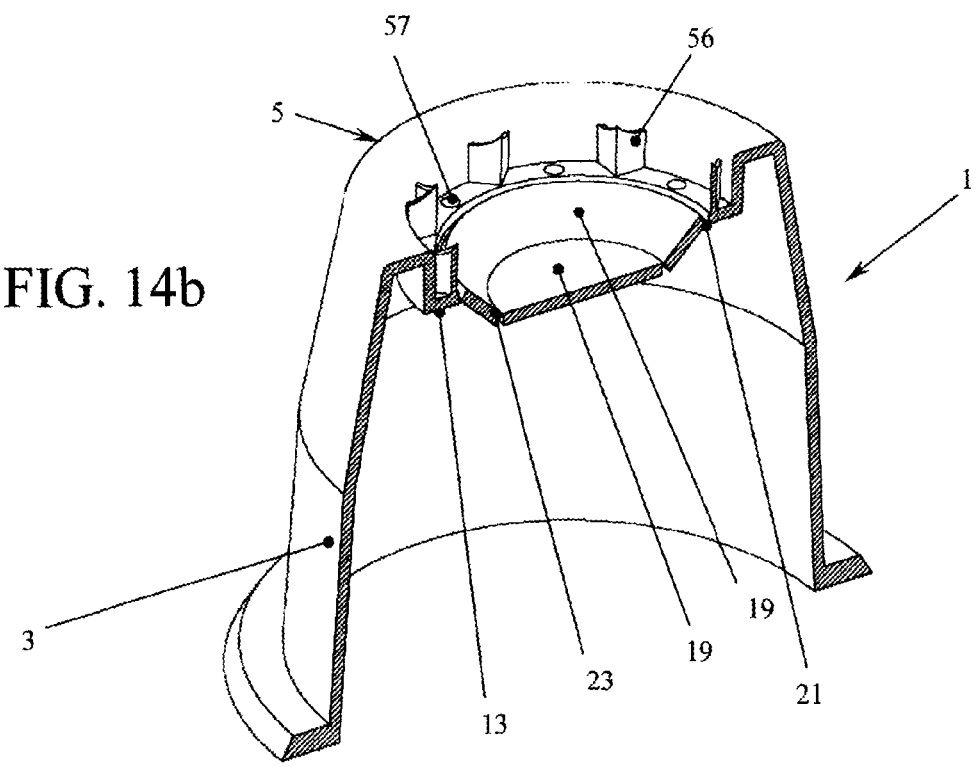
FIG. 14b shows a perspective and longitudinally section view of the capsule of the present invention in the delivering operating position of FIG. 13b.
Figure 15A:
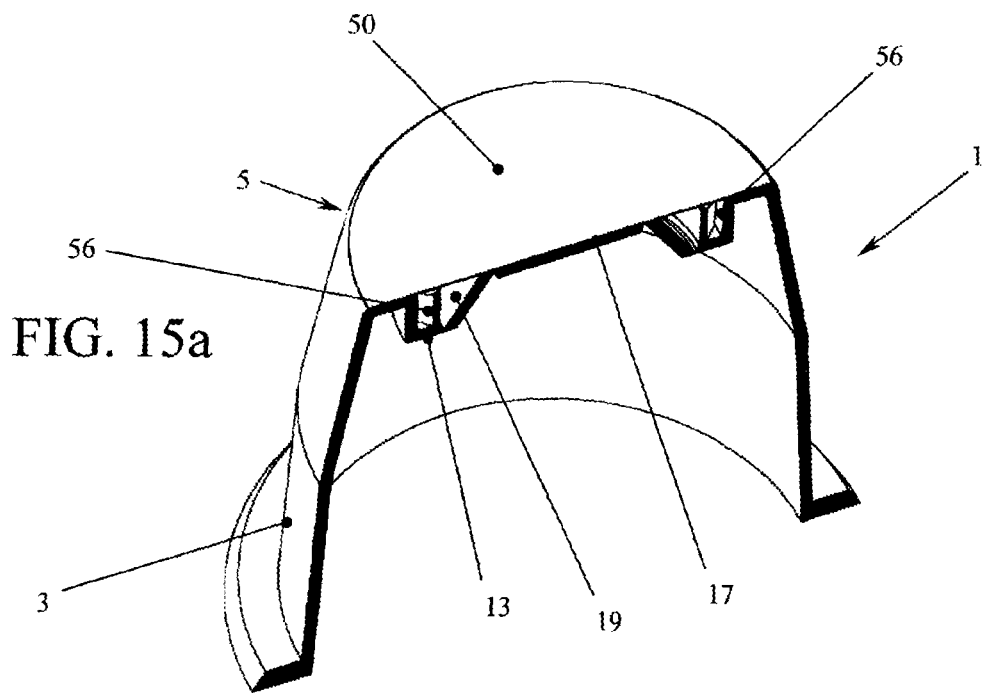
FIG. 15a shows a perspective and longitudinally sectioned view of the capsule of the FIG. 14a assembled and in the closed operating position.
Figure 15B:
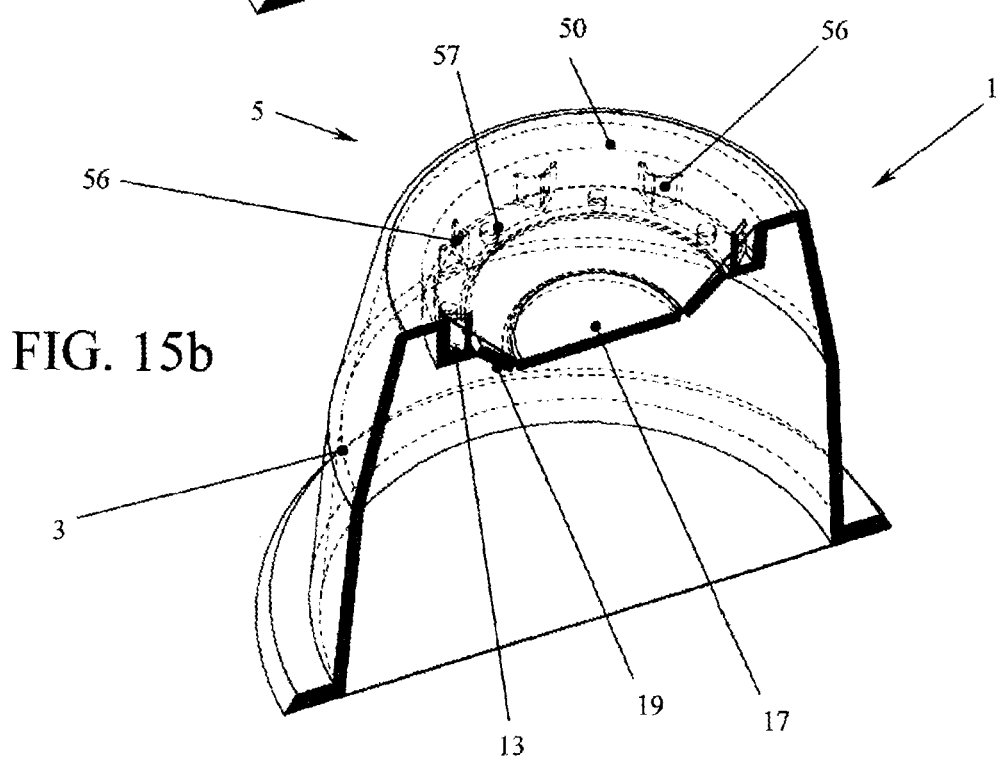
FIG. 15b shows a perspective and longitudinally sectioned view of the capsule of FIG. 14b assembled and in the delivering operating position.
Figure 20A:
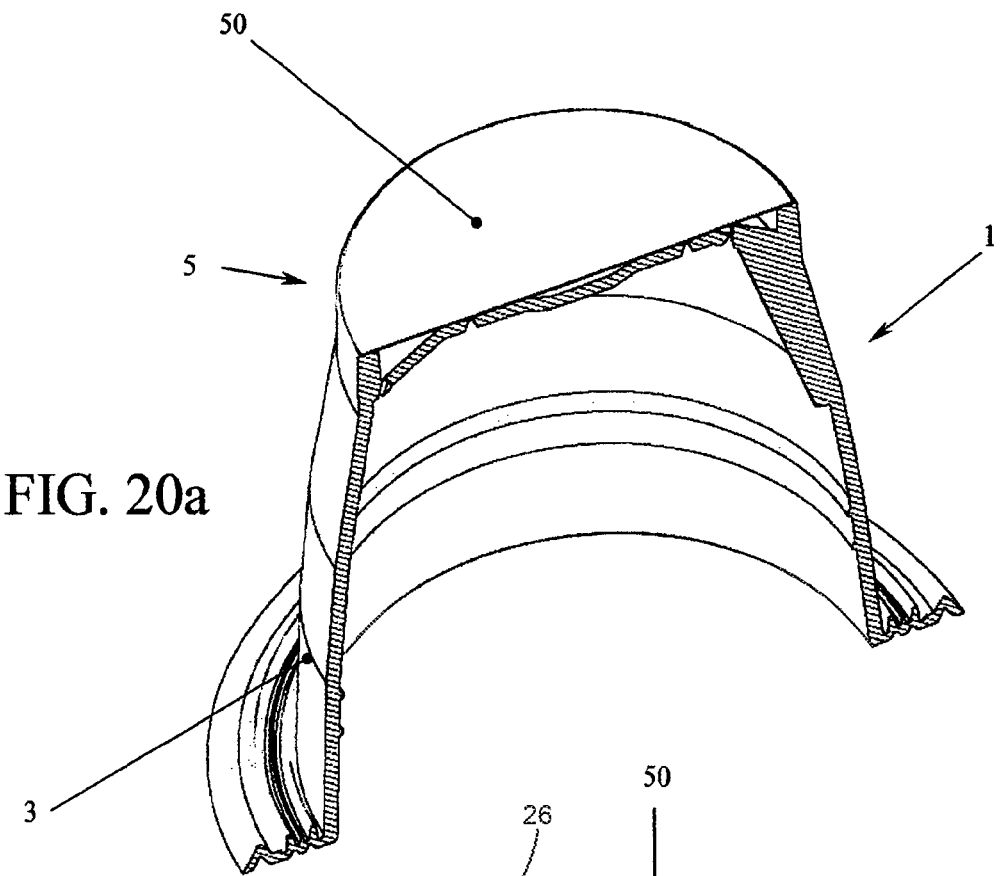
FIG. 20a shows a perspective and longitudinally sectioned view of the capsule of FIG. 19a assembled and in the closed operating position.
Figure 20B:
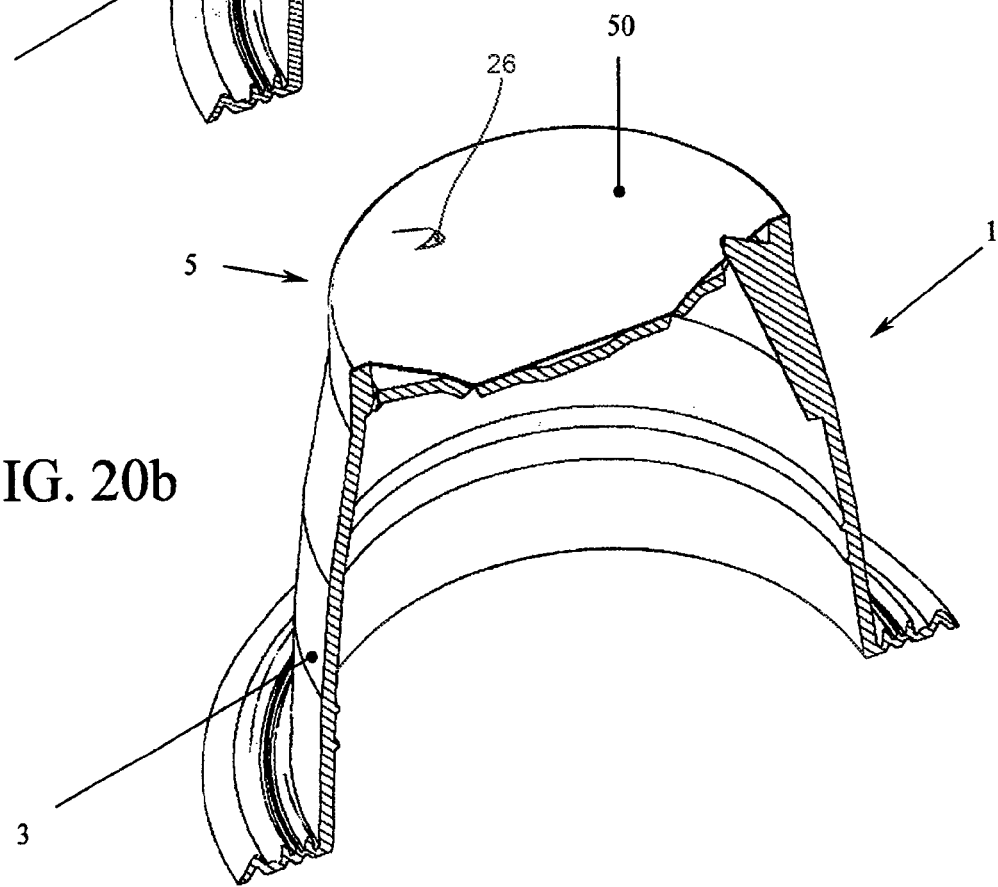
FIG. 20b shows a perspective and longitudinally sectioned view of the capsule of FIG. 19b assembled and in the delivering operating position.
Figure 21:
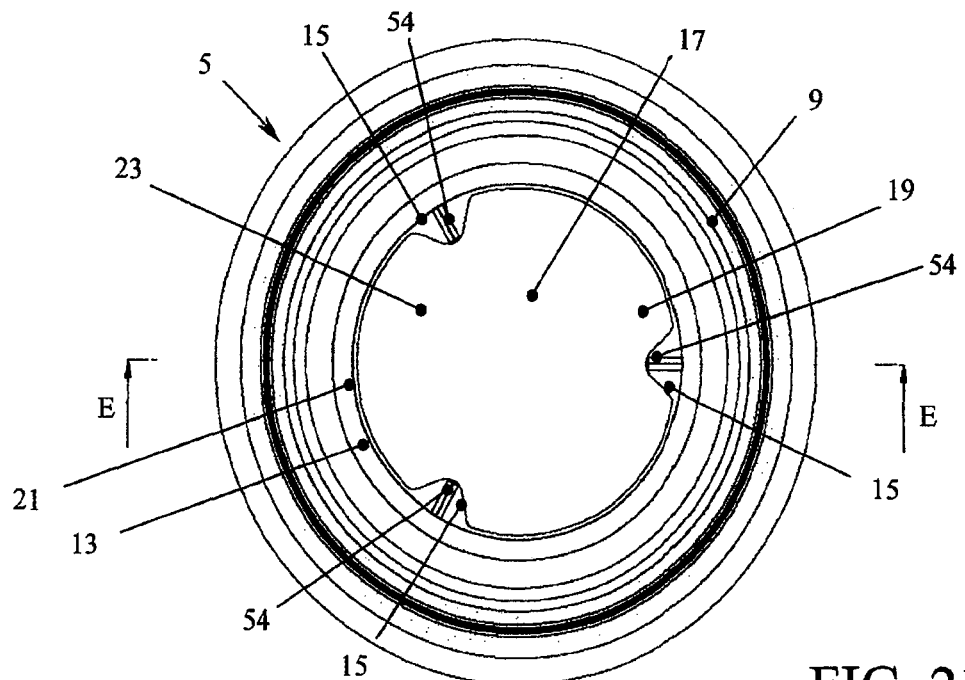
FIG. 21 shows a bottom plan view of the capsule of the present invention in FIGS. 19a and 19b.
Figure 22A:
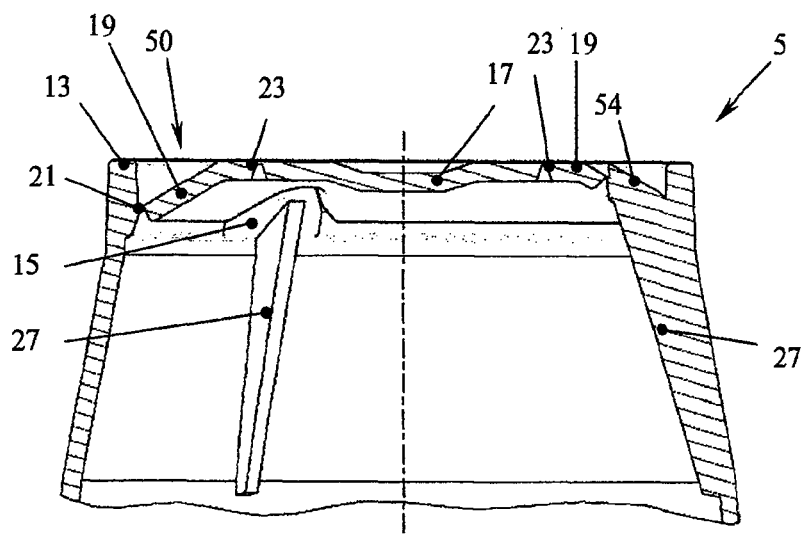
FIG. 22a shows a view along section line E-E of FIG. 21 of the first portion of the capsule of the present invention in a closed operating position.
Figure 22B:
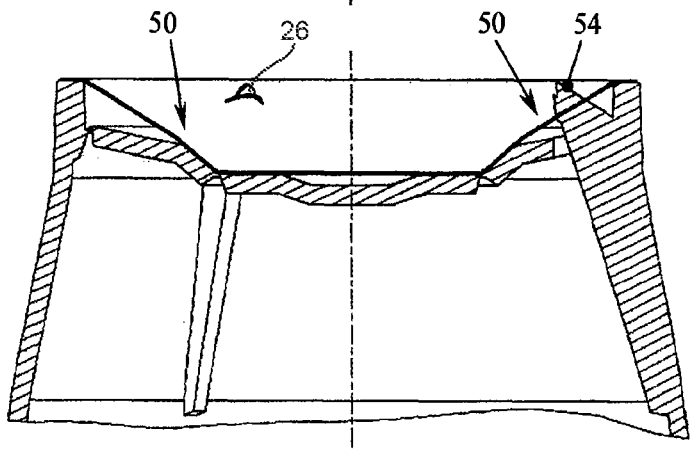
FIG. 22b shows a view along section line E-E of FIG. 21 of the first portion of the capsule of the present invention in a delivering operating position.
Figure 23:
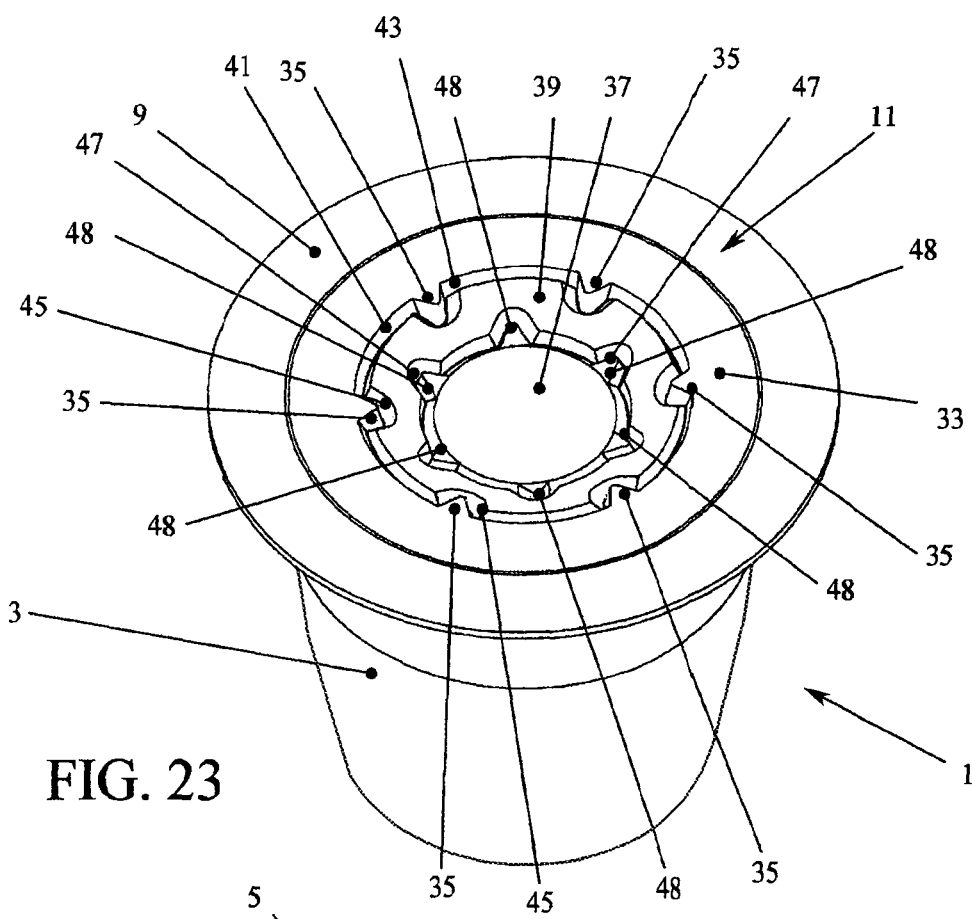
FIG. 23 shows a top perspective view of a preferred embodiment of the capsule of the present invention with a second portion in a closed operating position.
Figure 24:
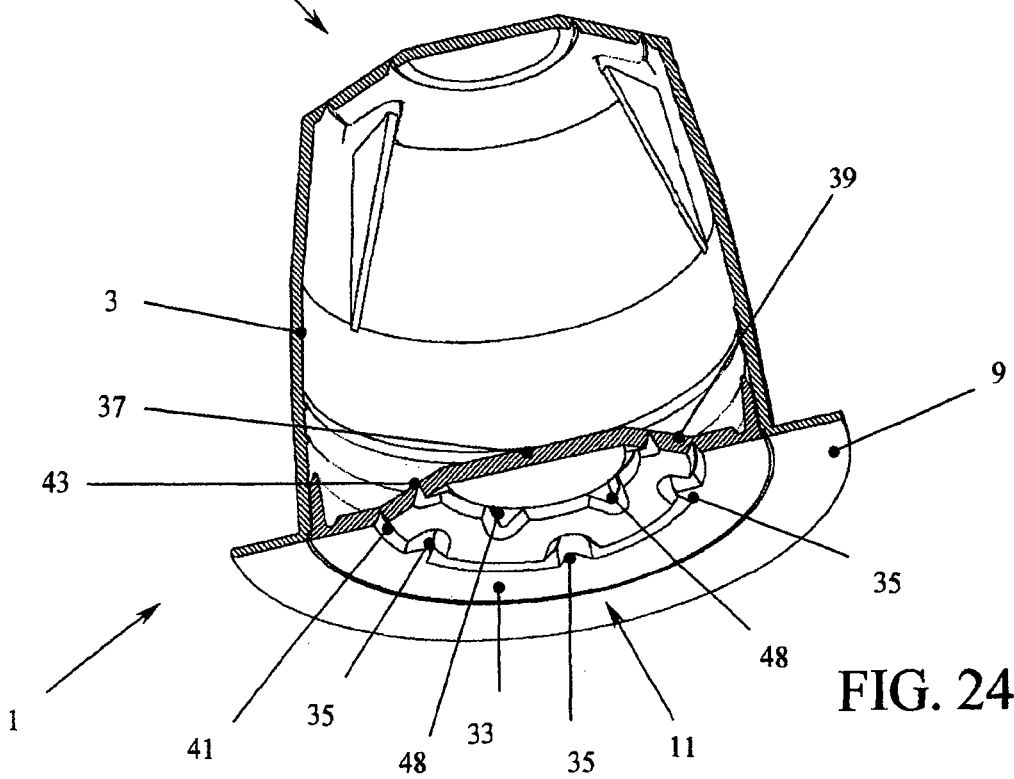
FIG. 24 shows a perspective and longitudinally sectioned view of the capsule of FIG. 23.
Figure 25:
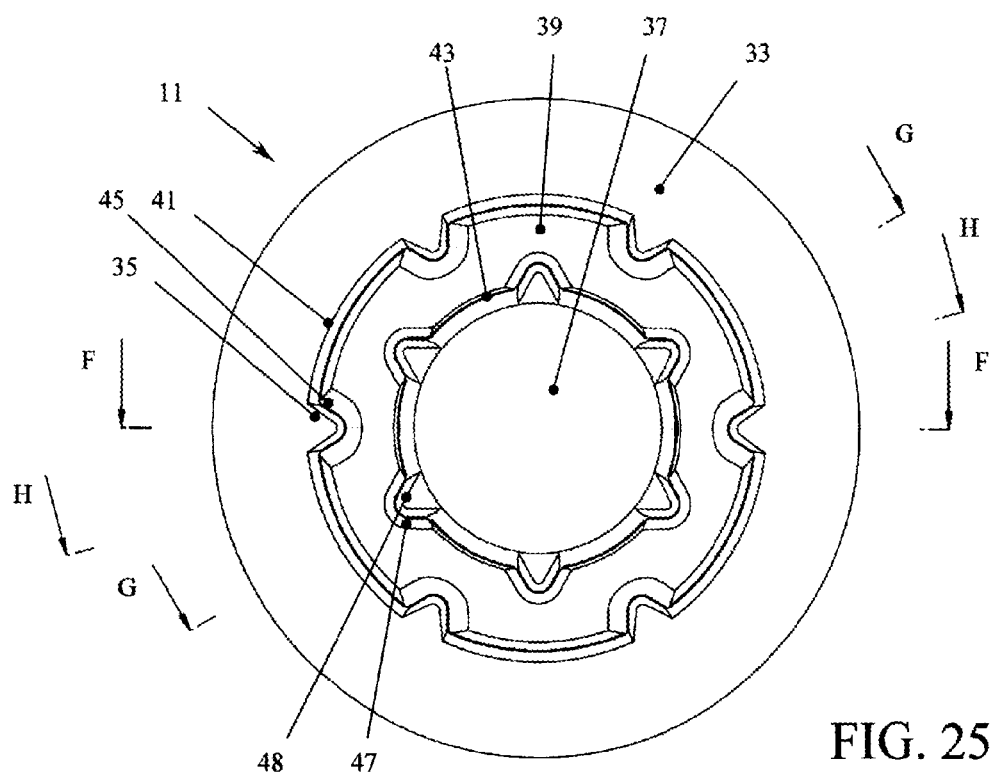
FIG. 25 shows a top plan view of the capsule of FIG. 23.
Figure 26A:
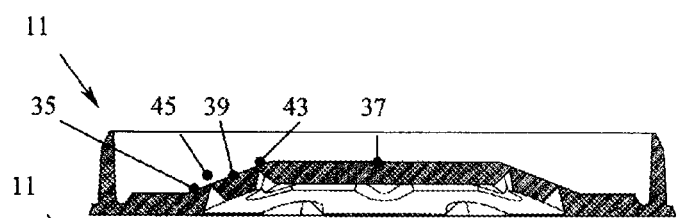
FIG. 26a shows a view along section line F-F of FIG. 25 of the second portion of the capsule of the present invention in a closed operating position.
Figure 26B:
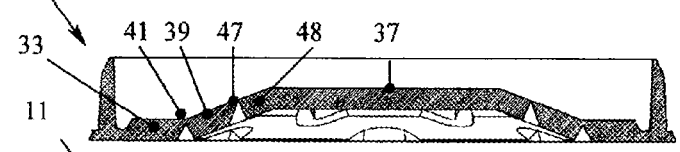
FIG. 26b shows a view along section line G-G of FIG. 25 of the second portion of the capsule of the present invention in a closed operating position.
Figure 26C:
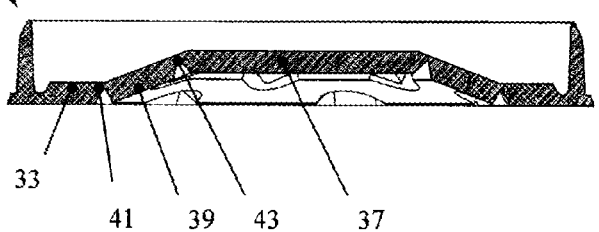
FIG. 26c shows a view along section line H-H of FIG. 25 of the second portion of the capsule of the present invention in a closed operating position.
Figure 27:
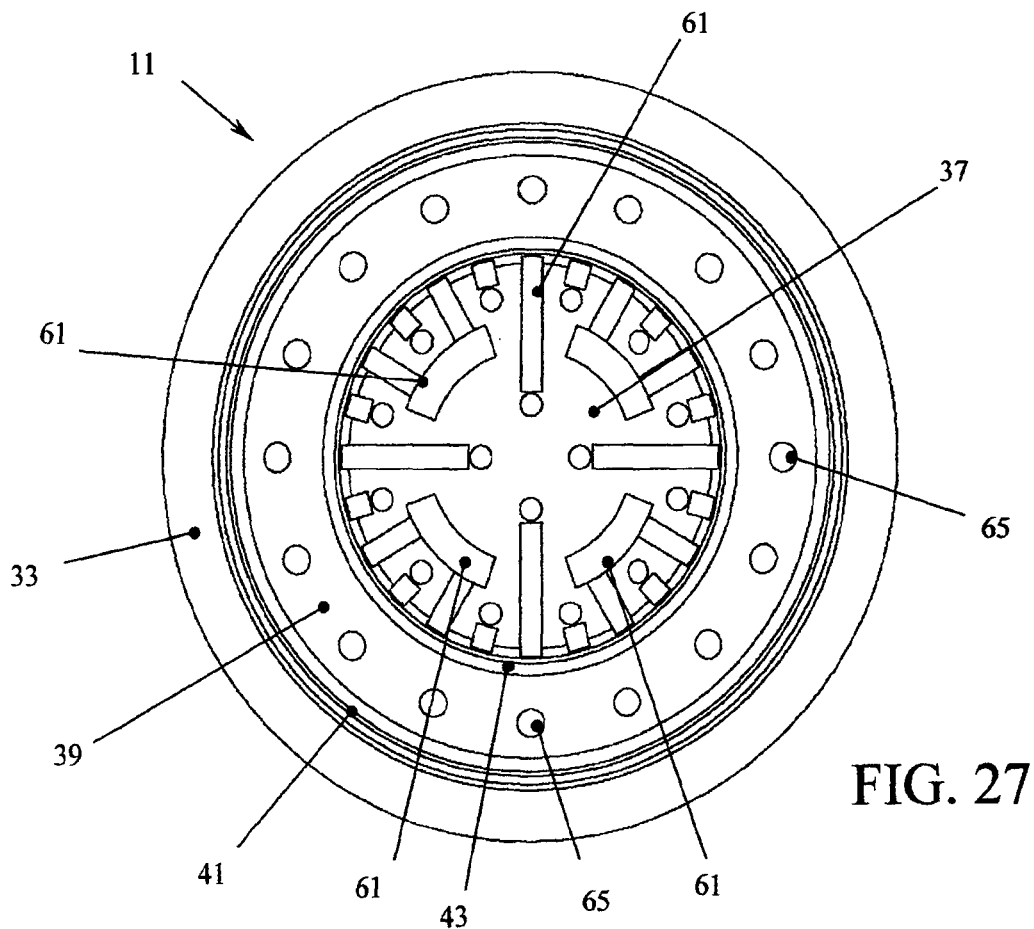
FIG. 27 shows a plan view of another preferred embodiment of the second portion of the capsule of the present invention.
Figure 28:
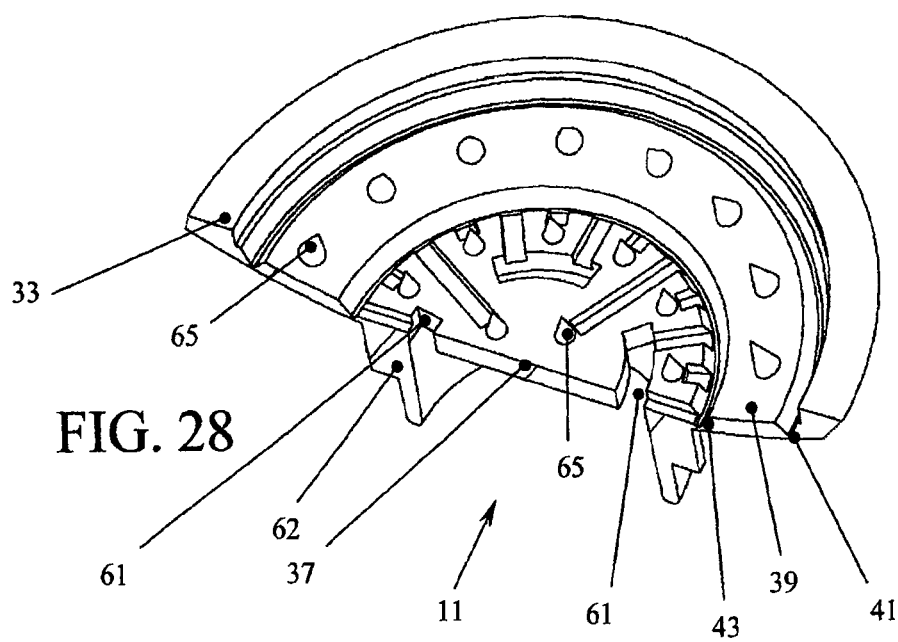
FIG. 28 shows a perspective and cross sectional view of the second portion of the capsule of FIG. 27.
Figure 30A:
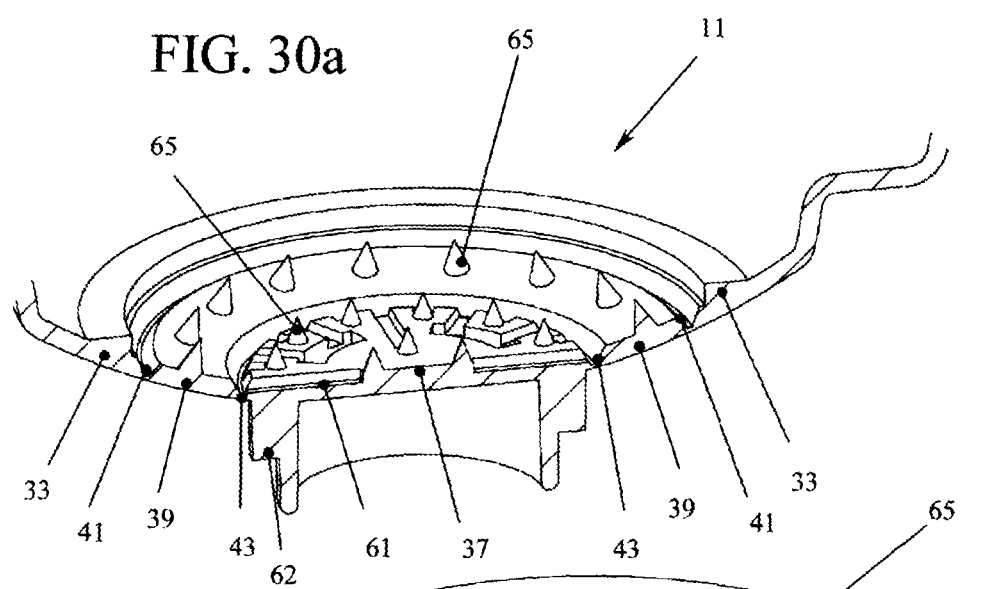
FIG. 30a shows a perspective and cross sectional view of the second portion of the capsule of FIG. 27 in the closed operating position.
Figure 30B:
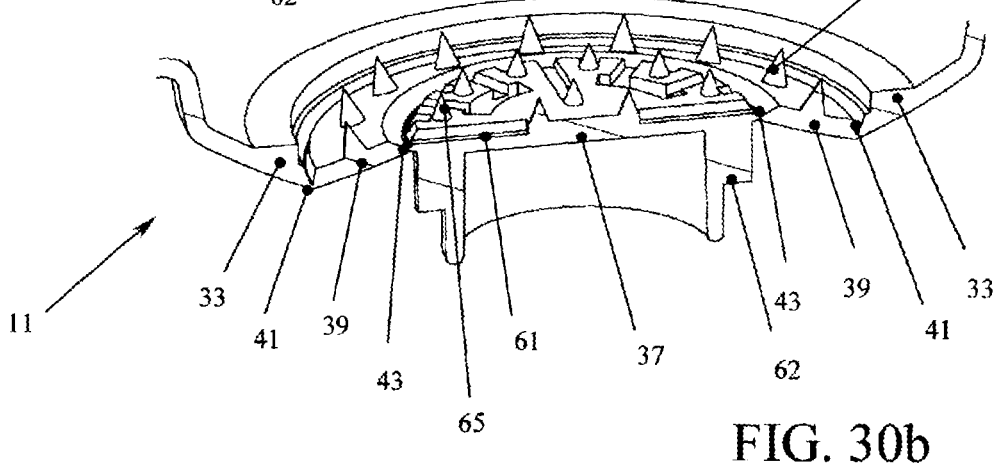
FIG. 30b shows a perspective and cross sectional view of the second portion of the capsule of FIG. 27 in the delivering operating position.

With reference to the Figures, it is possible to note that the capsule 1 of the present invention for preparing beverages, in particular coffee through infusion, comprises at least one containing body 3 having at least one first portion 5 for introducing at least one fluid, for example infusion water, inside the containing body 3, the containing body 3 defining at least one internal volume adapted to contain at least one substance for preparing the beverage, typically in granular shape or in powder, to be infused.

Advantageously, the first portion 5 is composed of:
at least one first, substantially rigid perimeter edge 13;
at least one first central portion 17 onto which at least one external pressing force is adapted to be applied, for example by at least one pressing means (not shown) of a prior art preparing machine, inside which the capsule 1 of the present invention is suitably inserted for preparing a beverage; preferably the first central portion 17 is of a circular shape coaxial to the longitudinal axis of symmetry of the containing body 3. Moreover, preferably, the pressing force is exerted from outside onto the first central portion 17 by the pressing means along a substantially parallel direction to the longitudinal axis of symmetry and, still more preferably, substantially coincident with the axis;

at least one first crown portion 19 collapsible towards inside the containing body 3 to create one or more passageways from outside the capsule 1 towards the internal volume through the first portion 5 under the action of the pressing force exerted by the pressing means at least onto the first central portion 17 and/or onto the first crown portion 19, the first crown portion 19 being interposed between the first perimeter edge 13 and the first central portion 17, the first crown portion 19 being connected on its perimeter to the first perimeter edge 13 by interposing at least one first bending line 21 and being connected to the first central portion 17 by interposing at least one second bending line 23.

In one of the preferred embodiments of the capsule 1 according to the present invention, like the one shown in particular in FIGS. 1*a* to 4*b*, or 18*a* to 19*b*, or 31 to 34*d* the first perimeter edge 13 is equipped with one or more first opening profiles 15, these first opening profiles 15 being preferably radially arranged along a circumference coaxial with a longitudinal axis of symmetry of the containing body 3; moreover, each of the first opening profiles 15 is connected to the first crown portion by interposing at least one respective first programmed breaking line 25, at least one of the first programmed breaking lines 25 being adapted to be torn when the pressing force exerted by the pressing means at least onto the first central portion 17 and/or onto the first crown portion 19 reaches a predetermined value, separating at least partially at least one of the first opening profiles 15 from the first crown portion 19.

Therefore, starting from the closed operating position of the first portion 5 of the capsule 1 according to the present invention shown in particular in FIGS. 1, 4*a*, 18*a*, 19*a*, 31, 33 and 34 by applying a pressing force through the pressing means of the preparing machine onto the first central portion 17, the first crown portion 19 is brought to collapse inside the volume of the containing body 3 rotating, related to the first perimeter edge 13 and to the first central portion 17, respectively around the first bending line 21 and the second bending line 23, causing the first programmed breaking lines 25 to be torn, and separating the related first opening profiles 15 from the first crown portion 19 and obtaining the passageways through the first portion 5, consequently taking the first portion 5 of the capsule 1 according to the present invention in its delivering operating position, like the one shown for example in particular in FIGS. 1*b*, 2, 4*b*, 18*b* and 19*b*: in fact, the above separation of the first opening profiles 15 from the first crown portion 19 deriving from the collapsing of the first crown portion 19 towards inside the containing body 3 deriving from the pressing force exerted onto the first central portion 17, creates, between at least one of the first profiles 15 and the first crown portion 19, respective first passage openings 26 which communicate the outside of the capsule 1 with the internal volume of the containing body 3, the first openings 26 consequently enabling the passage of the fluid delivered by the preparing machine in a substantially known way through the internal volume of the containing body 3 itself, and consequently through the substance to be infused contained therein, to go out through the covering, in the modes described below, as infusion beverage.

In addition, as it is possible to note in particular in the embodiment of the capsule 1 according to the present invention shown in particular in FIGS. 18*a* to 22*b*, the first portion 5 is covered at least partially and externally by at least one external covering layer 50, made for example as at least one protecting aluminium layer, interposed between the outside of the capsule 1 and at least the first central portion 17 and the first crown portion 19: moreover, at least one of the opening profiles 15 can be equipped with at least one cutting, perforating or breaking profile 54 adapted to perforate and/or tear the external covering layer 50 (as shown, for example, in particular in FIGS. 20*b* and 22*b*) when the pressing means of the preparing machine exert the pressing force onto the first central portion 17, obviously by interposing the external covering layer 50, in order to make the passageways through the first portion 5 and take the first portion 5 of the capsule 1 of the present invention to its delivering operating position, like the one for example shown, in particular, in FIGS. 1*b*, 2, 4*b*, 18*b* and 19*b*, in the above described modes. In fact, the creation, between the first profiles 15 and the first crown portion 19, of the first passage openings 26 and the simultaneous perforation and/or tearing of the external covering layer 50 by the first profiles 54 deriving from the collapse of the first crown portion 19 towards inside the containing body 3, communicates the internal volume of the containing body 3 with outside the capsule 1 through the first passage openings 26 and the tearings/perforations made by the first profiles 54 through the external covering layer 50, to consequently allow the passage of the fluid delivered from the preparing machine in a substantially known way, through the perforations/tearings made by the first profiles 54 through the external covering layer 50, the first passage opening(s) 26, and the internal volume of the containing body 3, and consequently through the substance to be infused contained therein, to go out through the covering, in the below described modes, as infusion beverage.

In some preferred embodiments, each one of the first opening profiles 15 is supported by a respective stiffening rib 27 adapted to keep the first profile 15 in a substantially fixed position upon applying the pressing force onto the first central portion 17 by the pressing means of the preparing machine and thereby favoring an easier breakage of the first programmed breaking lines 25.

As described in the previous paragraph, the presence of the stiffening rib is optional. FIGS. 31 to 34*d* show preferred embodiments of the capsule 1 without the presence of the stiffening rib 27. Even if the stiffening rib 27 favors an easier breakage of the first programmed breaking lines 25, they are not essential for the breaking of the programmed breaking lines and for the creation of the passage openings 26.

Preferably, as shown in FIGS. 4*a*, 32*d*, 33*c*, and 34*c*, the transverse thickness T at the first portion at the first programmed breaking lines 25 is smaller than the transverse thickness of the first portion at the first bending line 21 or/and at the second bending line 23. The smaller thickness further favors an easier breakage of the breaking lines.

Preferably, each of the first programmed breaking lines 25 is a thin membrane of plastic material, preferably the same material of the containing body 3.

Figure 31:
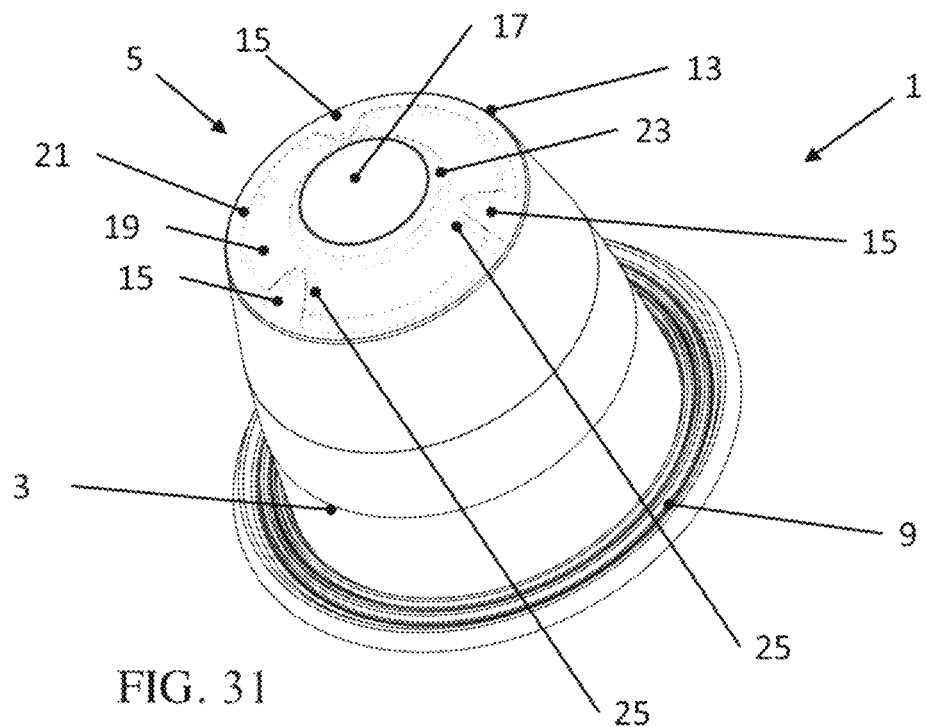
FIG. 31 shows a bottom perspective view of the capsule with its first portion in a closed operating position.
Figure 32A:
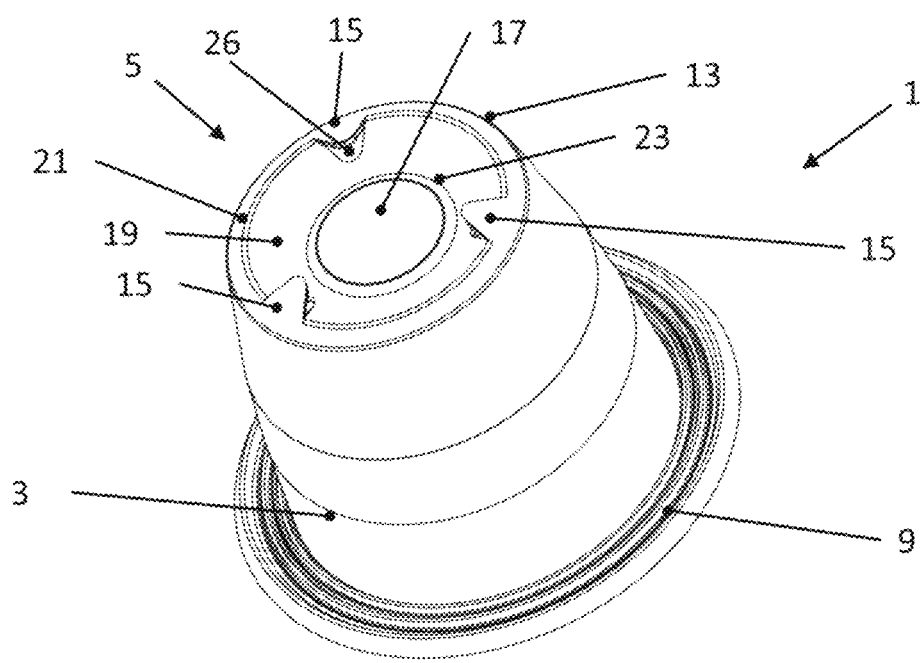
FIG. 32a shows a bottom perspective view of the capsule shown in FIG. 31 with its first portion in a delivering operating position.
Figure 32B:
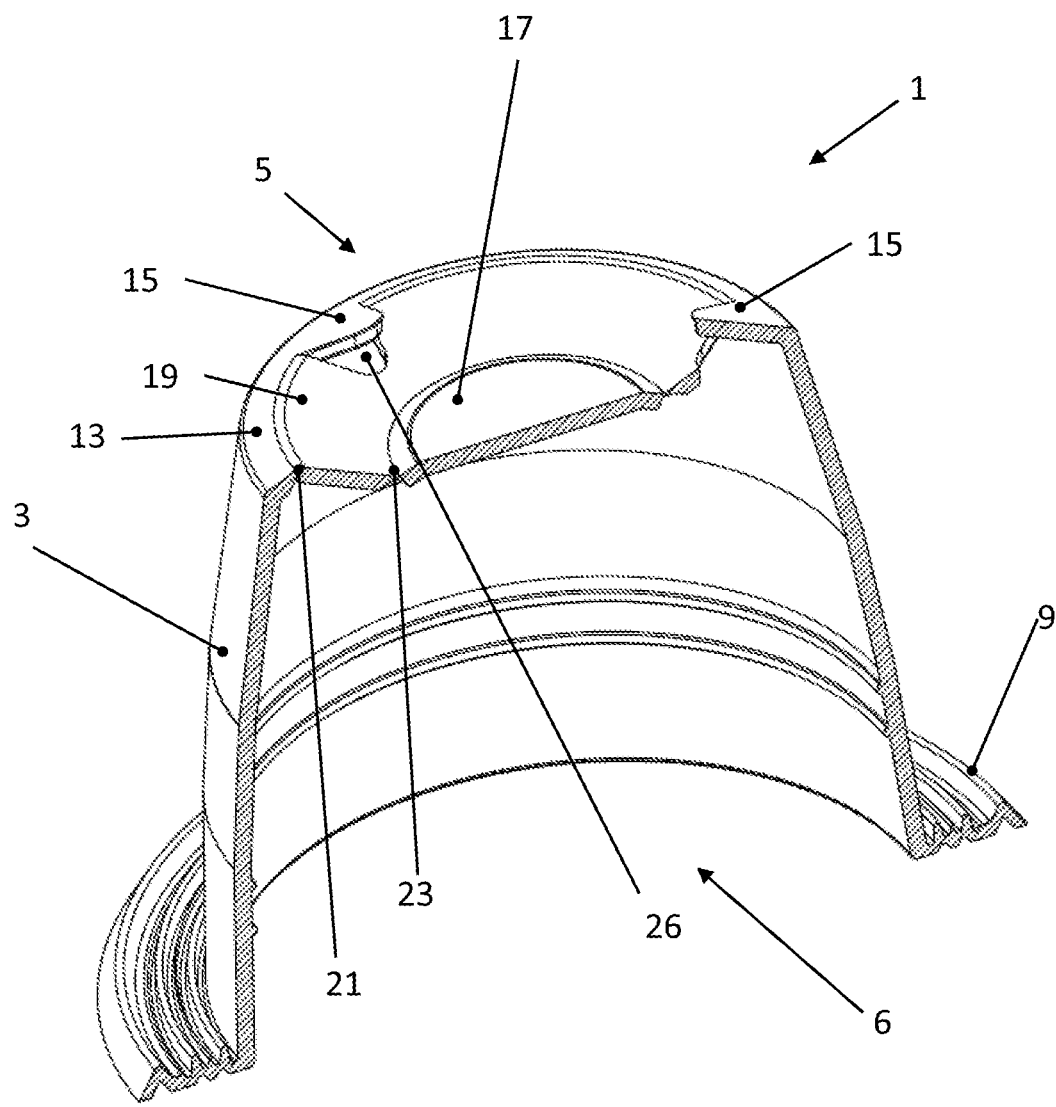
Figure 32C:
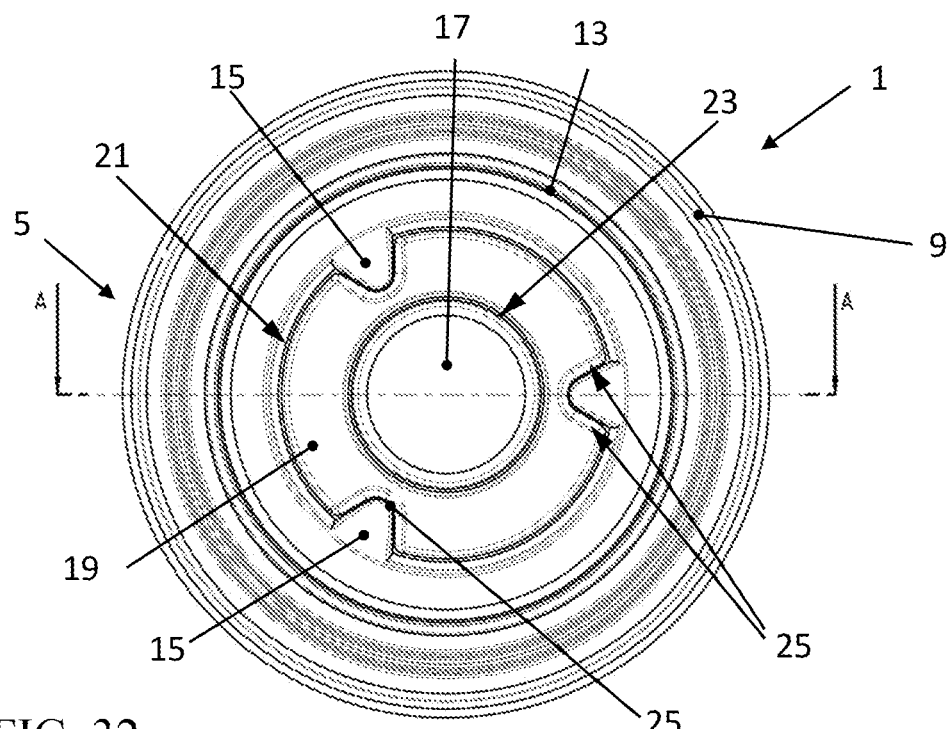
FIG. 32c shows a bottom plan view of the capsule of FIG. 31.
Figure 32D:
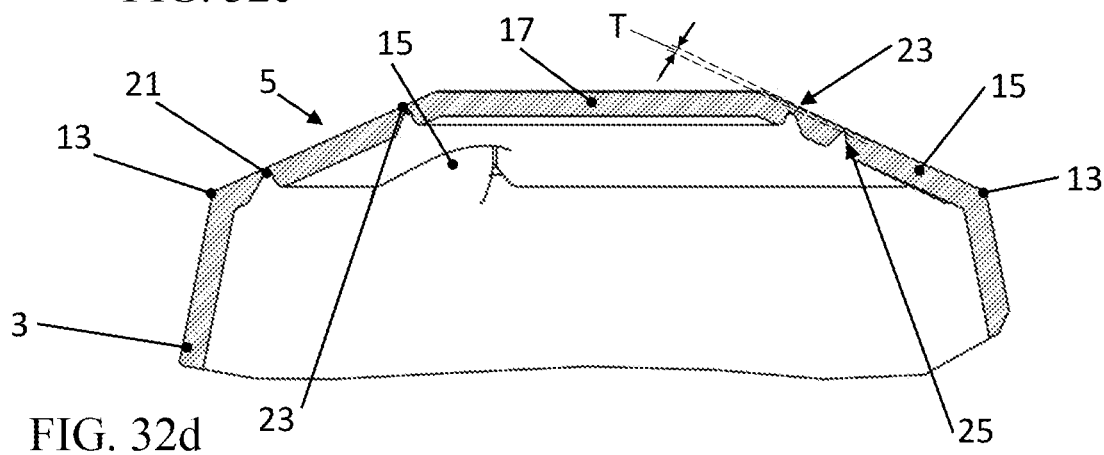
FIG. 32d shows a view along section line A-A of FIG. 32c of the first portion of the capsule of the present invention in a closed operating position.
Figure 32E:
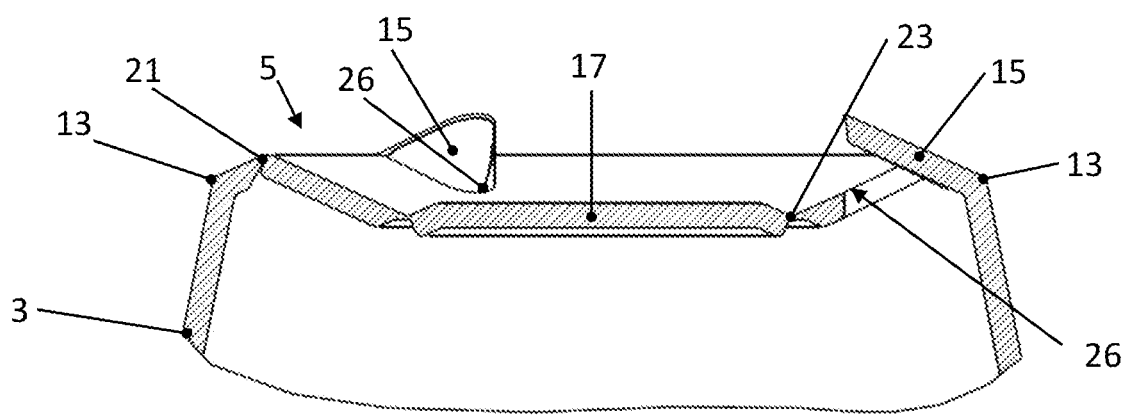
FIG. 32e shows a view along section line A-A of FIG. 32c of the first portion of the capsule of the present invention in a delivering operating position.

FIGS. 31 to 32*e* show a preferred embodiment of the capsule 1 where the transverse thickness of the first opening profiles 15 is the same as the transverse thickness of the first central portion 17 and/or the first collapsible portion 19 (for example crown portion 19) and/or the containing body 3.

Figure 34:
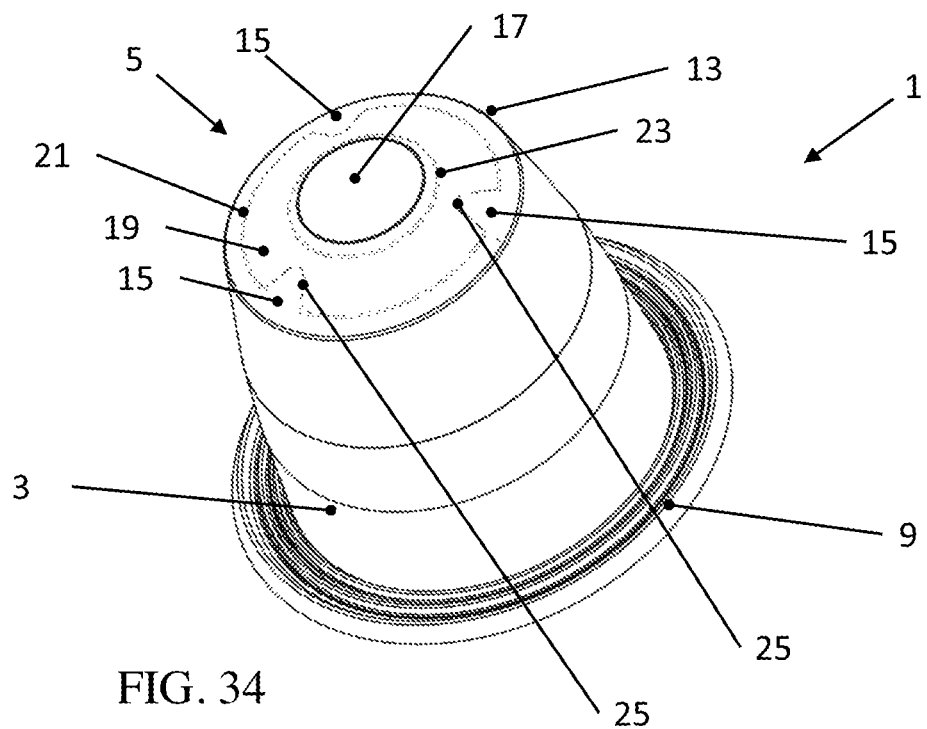
FIG. 34 shows a bottom perspective view of an additional preferred embodiment of the capsule of the present invention with its first portion in a closed operating position.
Figure 34A:
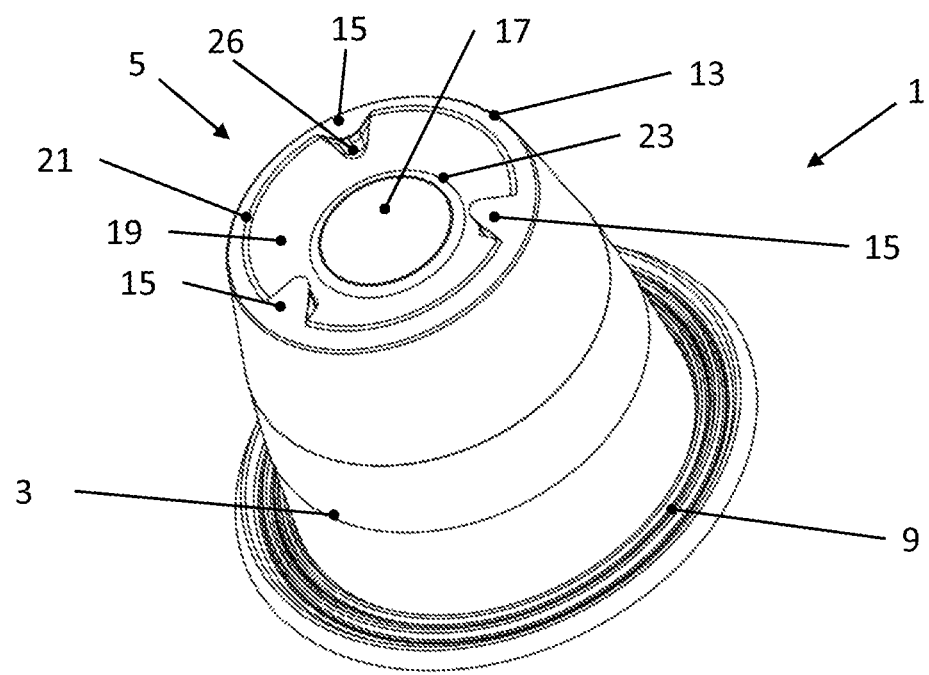
FIG. 34a shows a bottom perspective view of the capsule shown in FIG. 34 with its first portion in a delivering operating position.
Figure 34B:
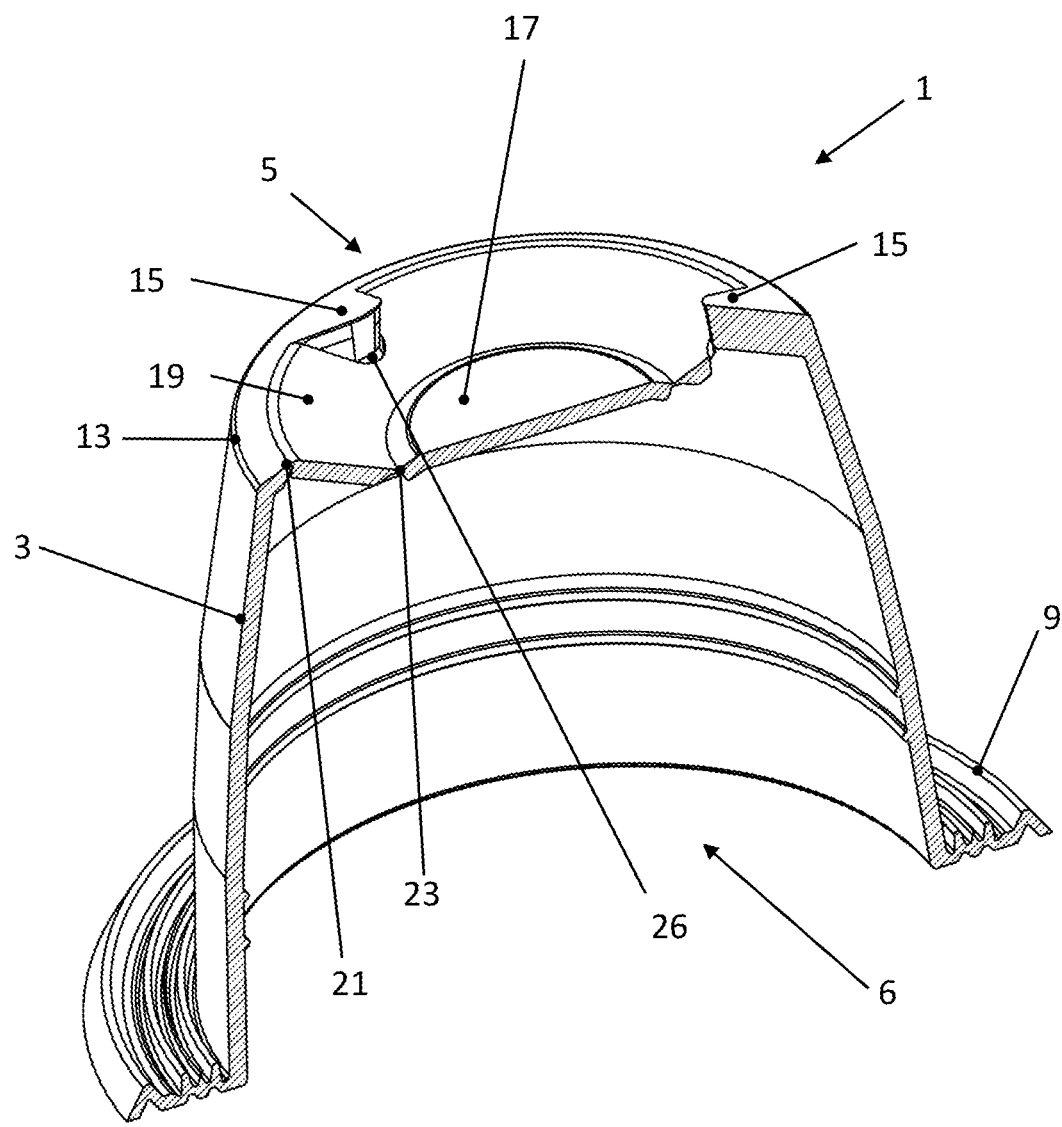
Figure 34C:
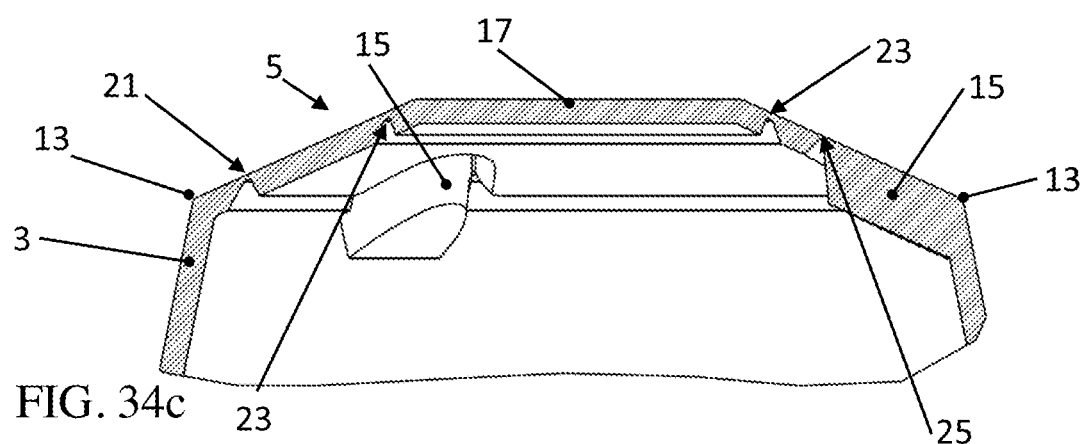
FIG. 34c shows a section view of the first portion of the capsule of FIG. 34 in a closed operating position.
Figure 34D:
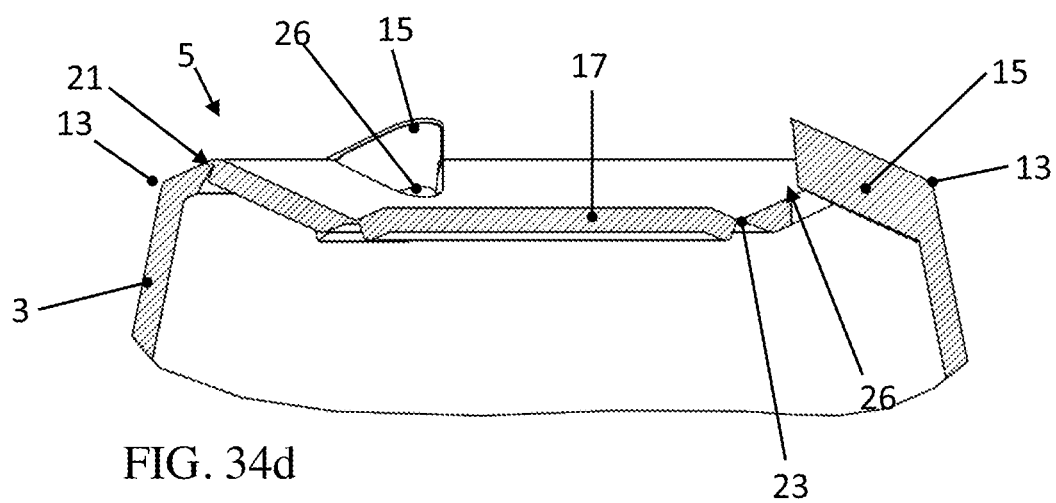
FIG. 34d shows a view of the first portion of the capsule of FIG. 34a in a delivering operating position.

FIGS. 34 to 34*d* show a preferred embodiment of the capsule 1 where the transverse thickness of the first opening profiles 15 is greater than the transverse thickness of the first central portion 17 and/or the first collapsible portion 19 and/or the containing body 3, for example is the double of the transverse thickness of central portion 17 and/or the first collapsible portion 19 and/or the containing body 3. The presence of thicker first opening profiles 15 favors keeping the first opening profiles 15 in a substantially fixed position, further favoring an easier breakage of the first programmed breaking lines 25.

Figure 33:
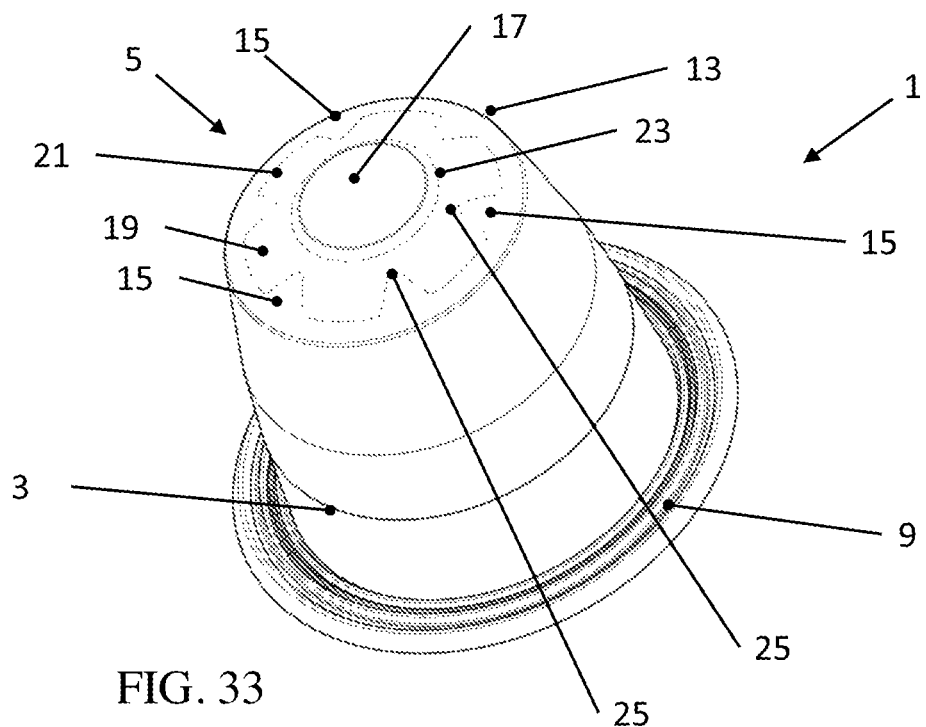
FIG. 33 shows a bottom perspective view of a further preferred embodiment of the capsule of the present invention with its first portion in a closed operating position.
Figure 33A:
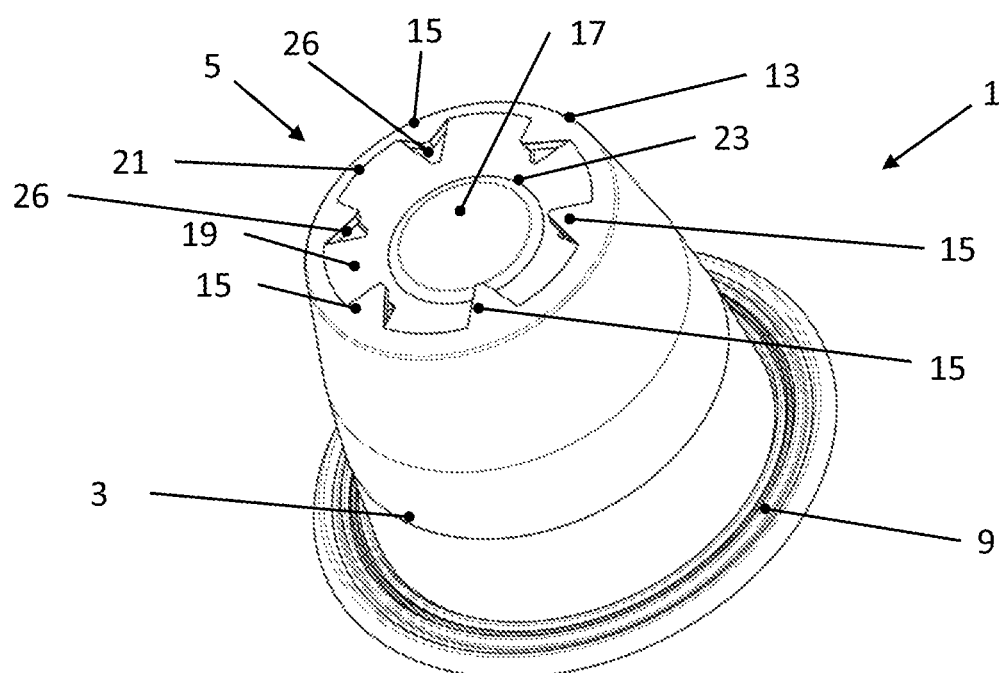
FIG. 33a shows a bottom perspective view of the capsule shown in FIG. 33 with its first portion in a delivering operating position.
Figure 33B:
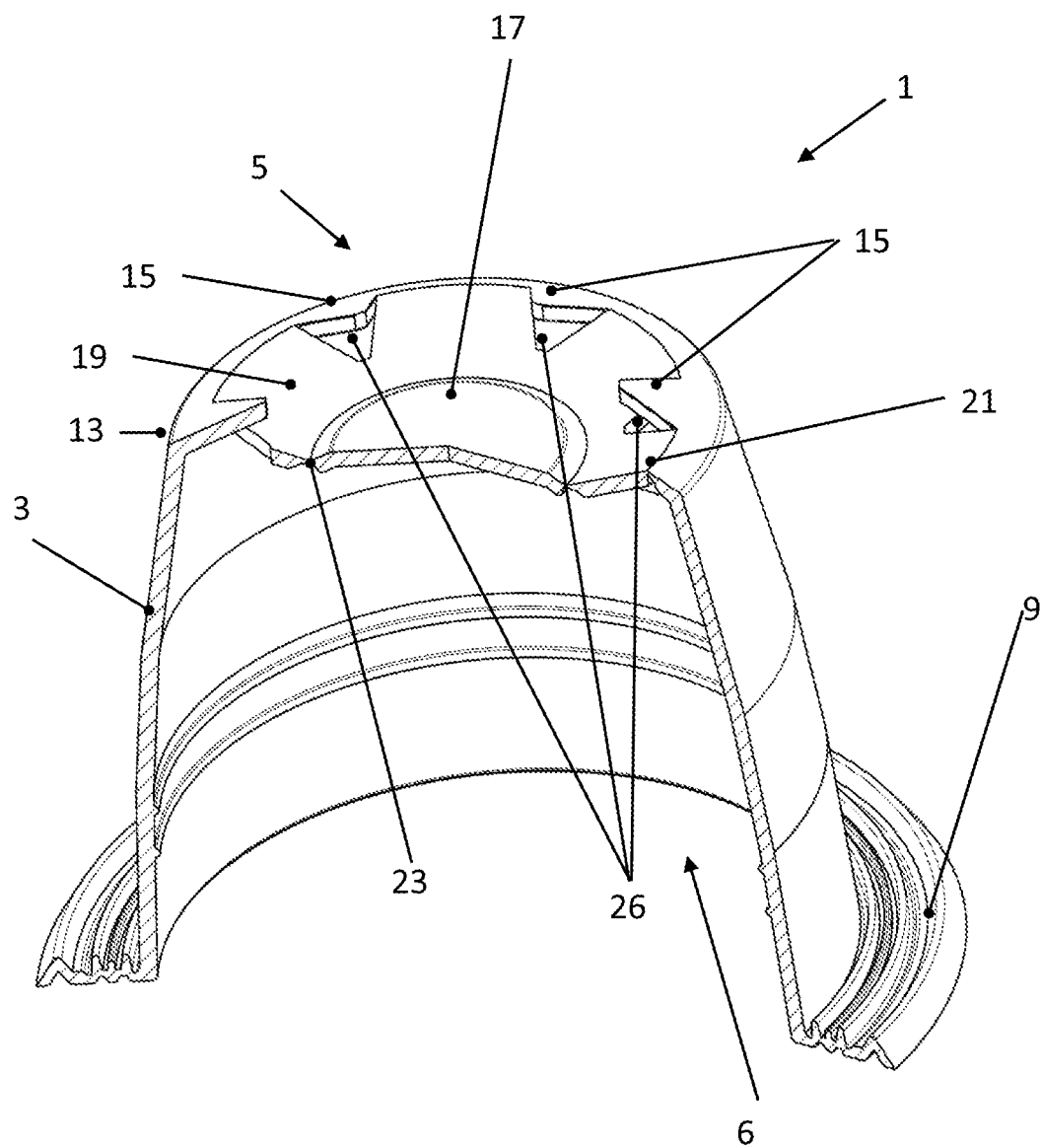
Figure 33C:
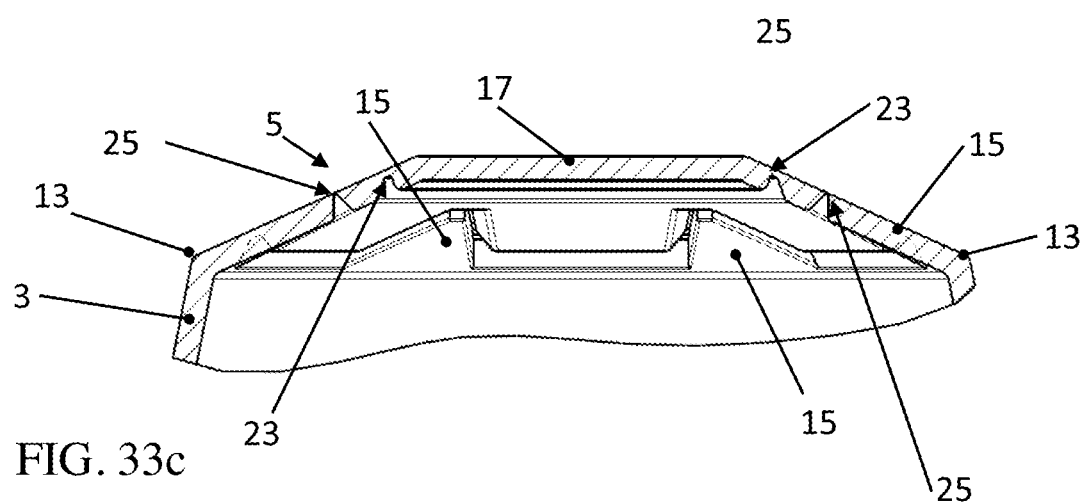
FIG. 33c shows a section view of the first portion of the capsule of FIG. 33 in a closed operating position.
Figure 33D:
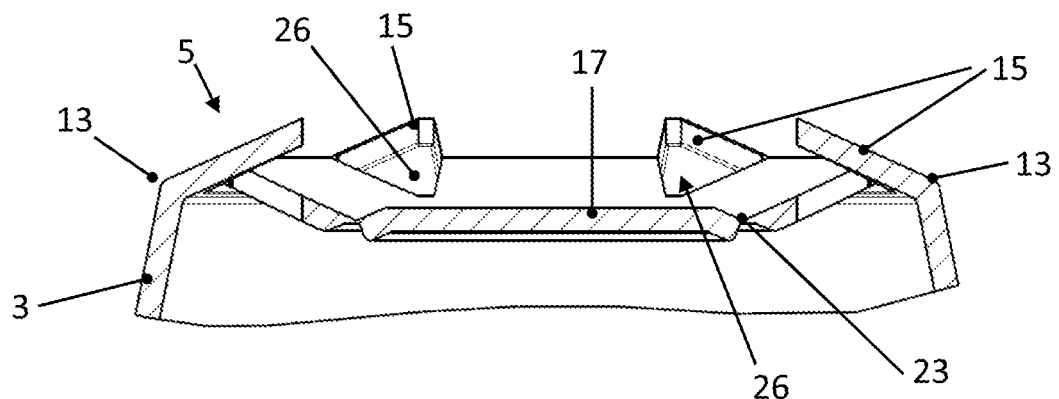
FIG. 33d shows a view of the first portion of the capsule of FIG. 33a in a delivering operating position.

FIGS. 33 to 33*d* show a further preferred embodiment of the capsule 1 where the number of the first opening profiles 15 is more than three. For example, the number of the first opening profiles are six. The presence of more than three first opening profiles 15 favors keeping the first opening profiles 15 in a substantially fixed position, further favoring an easier breakage of the first programmed breaking lines 25.

Preferably, in the embodiments shown in FIGS. 1*a* to 4*b*, or 18*a* to 19*b*, or 31 to 34*d*, the first opening profiles 15 are tongues that extend from the first perimeter edge 13 towards the first central portion 17. Preferably, the first opening profiles 15 have a substantially triangular shape or a triangular shape with rounded tip or edges.

In another of the preferred embodiments of the capsule 1 according to the present invention, like the one shown in particular in FIGS. 5*a* to 8*b* or 9*a* to 12*b*, the first portion 5 is equipped with one or more second passage openings 51 which communicate the outside of the capsule 1 with the internal volume of the containing body 3, the second passage openings 51 being preferably radially arranged on the first crown portion 19. Moreover, the capsule 1 of the present invention is equipped with at least one first internal covering layer 52, made for example as at least one protecting aluminium layer, interposed between the first portion 5 and the internal volume of the containing body 3, at least the surface of the first crown portion 19 facing the internal volume of the containing body 3, and in particular the first internal covering layer 52, being equipped with one or more first breaking means 53, preferably comprising a plurality of tips (like, for example, in the embodiment of the capsule 1 according to the present invention in FIGS. 5*a* to 8*b*) or cutting profiles (like, for example, in the embodiment of the capsule 1 according to the present invention of FIGS. 9*a* to 12*b*), each one of the profiles or the tips being arranged next to a related second passage opening 51, the first breaking means 53 being adapted to perforate and/or tear the first internal covering layer 52 when the pressing force exerted by the pressing means at least onto the first central portion 17 and/or onto the first crown portion 19 reaches a predetermined value to make the passageways through the first portion 5 and take the first portion 5 from its closed operating position, like the one shown in FIG. 8*a* or 12*a*, towards the delivering operating position, like the one shown in particular in FIG. 8*b* or 12*b*, communicating the internal volume of the containing body 3 with outside the capsule 1 through the second passage opening(s) 51 and the perforations/tearings made by the first breaking means 53 through the first internal covering layer 52. Therefore, starting from the closed operating position of the first portion 5 of the capsule 1 according to the present invention shown in particular in FIG. 5*a*, 6*a*, 8*a* or 9*a*, 10, 12*a*, by applying a pressing force through the pressing means of the preparing machine at least onto the first central portion 17, the first crown portion 19 is taken to collapse inside the volume of the containing body 3 by rotating, relative to the first perimeter edge 13 and the first central portion 17, respectively around the first bending line 21 and the second bending line 23, taking the first breaking means 53 to penetrate through the first internal covering layer 52, reaching the delivering operating position shown in particular in FIG. 5*b*, 6*b*, 8*b* or 9*b*, 12*b*, in order to consequently allow the passage of the fluid delivered by the preparing machine in a substantially known way through the second passage opening(s) 51, the perforations/tearings made by the first breaking means 53 and the internal volume of the containing body 3, and consequently through the substance to be infused contained therein, to go out through the covering, in the below described modes, as infusion beverage.

In another of the preferred embodiments of the capsule 1 according to the present invention, like the one shown in particular in FIGS. 13*a* to 17*b*, the first portion 5 is equipped with one or more third passage openings 57, the third passage openings 57 being preferably radially arranged on the first perimeter edge 13; moreover, the first portion 5 is externally covered by the external covering layer 50, interposed between the outside of the capsule 1, the first central portion 17, the first crown portion 19 and the first perimeter edge 13. Moreover, advantageously, the first perimeter edge 13 can be equipped with one or more second cutting, perforating or breaking profiles 56 (arranged, for example, along the first perimeter edge 13 in a position at an interval between the positions of the third passage openings 57), the second profiles 56 being adapted to perforate and/or tear the external covering layer 50 (as shown, for example, in particular in FIGS. 15*b* and 17*b*) when the pressing means of the preparing machine exert the pressing force onto the first central portion 17, obviously by interposing the external covering layer 50, to obtain the passageways through the first portion 5 and take the first portion 5 of the capsule 1 according to the present invention to its delivering operating position. In fact, starting from the closed operating position of the first portion 5 of the capsule 1 according to the present invention shown in particular in FIGS. 13*a*, 14*a*, 15*a* and 17*a*, by applying a pressing force through the pressing means of the preparing machine at least onto the first central portion 17, the first crown portion 19 is taken to collapse inside the volume of the containing body 3, as already previously described, compressing the external covering layer 50 against the second profiles 56, which take care of perforating and/or tearing the layer 50 itself, till the delivering operating position shown in particular in FIGS. 13*b*, 14*b*, 15*b* and 17*b* is reached, in order to consequently allow the passage of the fluid delivered from the preparing machine in a substantially known way through the perforations/tearings through the external covering layer 50, the third passage openings 57 and the internal volume of the containing body 3, and consequently through the substance to be infused contained therein, to go out through the covering, in the below described modes, as infusion beverage.

Preferably, the first and second bending lines 21, 23, and possibly the first programmed breaking lines 25 are made as striction lines of the material, typically plastics, composing the first portion 5 of the capsule 1 of the present invention.

In addition, the capsule 1 according to the present invention could comprise at least one opening 6 opposite to the first portion 5 and adapted to be closed by at least one covering.

In a preferred embodiment thereof, like the one shown for example in FIG. 31, the covering comprises at least one layer of film 7 suitable to be perforated through known means of the preparing machine, as taught in the prior art, to allow the flow infusion beverage to go out through the perforation, the film 7 being welded or glued onto the perimeter edge 9 of the opening 6.

Alternatively or in addition, as it is possible to note in FIGS. 23 to 30b, the capsule 1 according to the present invention could comprise at least one second portion 11 for delivering the beverage from the containing body 3 toward outside, for example made as a plug inserted through the opening 6 or made integral with the containing body 3 itself, the second portion 11 being composed of:

at least one second, substantially rigid perimeter edge 33;

at least one second central portion 37;

at least one second crown portion 39 collapsible towards outside or inside the containing body 3 under the action of at least one pressing force, for example exerted by the above pressing means or by the flow of infusion beverage created inside the containing body 3 through the passage therein of the flow of fluid passing through the first passage openings 26 of the first portion 5 in its delivering operating position, mentioned above, to create one or more passageways of the flow from the internal volume towards outside the capsule 1 through the second portion 11, the second crown portion 39 being interposed between the second perimeter edge 33 and the second central portion 37, the second crown portion 39 being connected on its perimeter to the second perimeter edge 33 by interposing at least one third bending line 41 and being connected to the second central portion 37 by interposing at least one fourth bending line 43.

In the preferred embodiment of the capsule 1 according to the present invention shown in particular in FIGS. 23 to 26c, it is possible to note that the second perimeter edge 33 can be equipped with one or more second opening profiles 35, the second opening profiles 35 being preferably radially arranged along a circumference coaxial with a longitudinal axis of symmetry of the containing body 3. Moreover, the second central portion 37 can be equipped on its perimeter with one or more third opening profiles 48, also the third opening profiles 48 being preferably radially arranged along a circumference coaxial with a longitudinal axis of symmetry of the containing body 3. Moreover, each one of the second opening profiles 35 is connected to the second crown portion 39 by interposing at least one respective second programmed breaking line 45, at least one of the second programmed breaking lines 45 being adapted to be torn when the pressing force exerted by the flow of infusion beverage inside the containing body 3 on the second portion 11 reaches a predetermined value separating at least partially at least one of the second opening profiles 35 from the second crown portion 39. Moreover, if present, each of the third opening profiles 48 is connected to the second crown portion 39 by interposing at least one respective third programmed breaking line 47, also at least one of the third programmed breaking lines 47 being adapted to be torn when the pressing force exerted by the flow of infusion beverage inside the containing body 3 on the second portion 11 reaches a predetermined value, separating at least partially at least one of the third opening profiles 48 from the second crown portion 39.

Therefore, starting from the closed operating position of the second portion 11 of the capsule 1 according to the present invention shown in particular in FIGS. 23 to 26c, the pressing force exerted onto the second portion 11 itself by the flow of infusion beverage being created inside the containing body 3 through the passage therein of the flow of infusion water passing through the first passage openings 26 of the first portion 5 in its delivering operating position, mentioned above, brings the second crown portion 39 to collapse towards outside the volume of the containing body 3 by rotating, relative to the second perimeter edge and to the second central portion 37, respectively around the third bending line 41 and the fourth bending line 43, tearing the second programmed breaking lines 45, and, if present, the third programmed breaking lines 47, and separating the related second opening profiles 35, and, if present, the related third profiles 51, from the second crown portion 39, creating one or more flow passageways from the internal volume towards outside the capsule 1 through the second portion 11 and consequently taking the second portion 11 of the capsule 1 according to the present invention to a delivering operating position thereof (not shown): in fact, the above separation of the second opening profiles 35, and possibly of the third opening profiles 48, from the second crown portion 39 deriving from the collapse of the second crown portion 39 towards outside the containing body 3 deriving from the pressing force exerted by the flow of infusion beverage, creates, between at least one of the second profiles 35, and possibly of the third profiles 48, and the second crown portion 39, respective third and possibly fourth passage openings which communicate the internal volume of the containing body 3 with outside the capsule 1, the second portion 11 consequently enabling the passage of the infusion beverage from inside the containing body 3 towards outside the capsule 1, going out through the second and third openings.

In another of the preferred embodiments of the capsule 1 according to the present invention, like the one shown in particular in FIGS. 27 to 30b, the second portion 11 is equipped with one or more fifth passage openings 61 adapted to communicate the internal volume of the containing body 3 with outside the capsule 1, the fifth passage openings 61 being preferably arranged on the second central portion 37. Moreover, the second central portion 37 is externally equipped with at least one abutment means 62, made preferably as one or more fins or at least one circular collet, adapted to abut against the delivery portion 70 of the seat of the preparing machine suitable to house the capsule 1 for preparing the beverage. Moreover, the capsule 1 according to the present invention is equipped with at least one second internal covering layer 63, made for example as at least one protecting aluminium layer, interposed between the second portion 11 and the internal volume of the containing body 3, at least the surface of the second central portion 37 and possibly the surface of the second crown portion 39 facing towards the internal volume of the containing body 3, and in particular towards the second internal covering layer 63, being equipped with one or more second breaking means 65, preferably comprising a plurality of tips (like, for example, in the embodiment of the capsule 1 according to the present invention of FIGS. 27 to 30b) or cutting profiles, the second breaking means 65 being adapted to perforate and/or tear the second internal covering layer 63 when the pressing force exerted by the pressing means acting, through the abutment means 62 against the delivery portion 70, at least onto the second perimeter edge 33 reaches a predetermined value to obtain the passageways through the second portion 11 and take the second portion 11 itself from the closed operating position, like the one shown in FIGS. 28, 29a, 30a, towards the delivering operating position, like the one shown in particular in FIGS. 29b, 30b, communicating the internal volume of the containing body 3 with outside the capsule 1 through the fifth passage opening(s) 61 and the perforations/tearings made by the second breaking means 65 through the second internal covering layer 63. Therefore, starting from the closed operating position of the second portion 11 of the capsule 1 according to the present invention, due to the pressing force exerted at least onto the second perimeter edge 33 by the pressing means of the preparing machine and the abutment opposition of the abutment means 62 against the related delivery portion 70 of the related seat inside which the capsule 1 is inserted, the second crown portion 39 is taken to collapse inside the volume of the containing body 3 by rotating, related to the second perimeter edge 33 and to the second central portion 37, respectively around the third bending line 41 and the fourth bending line 43, taking the second breaking means 65 to penetrate through the second internal covering layer 65, reaching the delivering operating position in order to consequently enable the passage of the infusion beverage from the internal volume of the containing body 3 outside the capsule 1 through the perforations/tearings made by the second breaking means 65 and the fifth passage opening(s) 61.

Also in this case, preferably, the third and fourth bending lines 41, 43 and the second and third programmed breaking lines 45 and 47 are made as striction lines of the material, typically plastics, composing the second portion 11 of the capsule 1 according to the present invention.

As further variation, and to avoid that aromas of the substance to be infused contained in the containing body 3 of the capsule 1 get dispersed, impairing the quality of the beverage, it is possible to provide that the plug 11 itself is also covered by at least one layer of film, welded or glued to the perimeter edge of the opening, the film being then adapted to be removed before using the capsule 1.

What is claimed is:

1. A capsule for preparing a beverage, the capsule comprising:
    a containing body forming an internal volume for housing a substance for preparing the beverage, the containing body including a fluid introducing portion for introducing a fluid into the containing body;
    wherein the fluid introducing portion includes—
        a perimeter edge,
        a central portion,
        a collapsible portion interposed between the perimeter edge and the central portion, and
        opening profiles connected to the perimeter edge and attached to the collapsible portion along programmed breaking lines extending away from the perimeter edge, the programmed breaking lines comprising an area of material thinner than both the collapsible portion and the opening profiles;
    wherein the collapsible portion is configured to rotate inward toward the internal volume by rotating relative to the perimeter edge and to the central portion when an inward force is exerted on the central portion causing the central portion to translate inward;
    such that the opening profiles tear away from the collapsible portion along the programmed breaking lines when the collapsible portion rotates inward, thereby creating openings for introducing the fluid into the internal volume; and
    wherein the opening profiles and the collapsible portion form a continuous integral layer before the collapsible layer collapses and the opening profiles tear away from the collapsible portion.

2. The capsule of claim 1 wherein the collapsible portion is attached to the perimeter edge by a first bending line and to the central portion by a second bending line, said collapsible portion being collapsible by rotating respectively around the first bending line and the second bending line.

3. The capsule of claim 2 wherein the first bending line is configured to be thinner than the perimeter edge or the collapsible portion.

4. The capsule of claim 3 wherein the second bending line configured to be thinner than the collapsible portion or the central portion.

5. The capsule of claim 1 wherein the breaking lines comprise notches composing said fluid introducing portion.

6. The capsule of claim 1 wherein the collapsible portion forms notches extending away from the perimeter edge and the opening profiles extend into the notches and attach to the notches along the programmed breaking lines.

7. A capsule for preparing beverages, the capsule comprising at least one containing body having at least one first portion for introducing at least one fluid, inside the at least one containing body, the at least one containing body defining at least one internal volume adapted to contain at least one substance for preparing the beverages, wherein the at least one first portion is composed of:
    at least one first perimeter edge;
    at least one first central portion disposed apart from and outside of the at least one internal volume;
    at least one first crown portion collapsible towards inside the at least one containing body to create one or more passageways from outside the capsule towards the at least one internal volume through the at least one first portion under an action of an external pressing force acting at least onto the first central portion and/or onto the first crown portion, the first crown portion being interposed between the first perimeter edge and the first central portion, the first crown portion being connected on its perimeter to the first perimeter edge by interposing at least one first bending line, constructed to have decreased thickness in comparison with adjacent first portion material, and being connected to the first central portion by interposing at least one second bending line, constructed to have decreased thickness in comparison with adjacent first portion material, the first perimeter edge being equipped with one or more first opening profiles, each one of the first opening profiles forming a single layer with the first crown portion with at least one respective first programmed breaking line interposed between each one of the first opening profiles and the first crown portion and thinner than both each one of the first opening profiles and the first crown portion, at least one of the first programmed breaking lines being adapted to be torn when the pressing force exerted by at least one pressing means of a preparing machine of the beverages at least onto the first central portion and/or onto the first crown portion pushes the central portion within the internal volume, tearing away at least partially at least one of the first opening profiles from the first crown portion, in order to make, between at least one of the first profiles and the first crown portion, respective first passage openings adapted to communicate an outside of the capsule with the internal volume of the containing body.

8. The capsule of claim 7, wherein the first central portion is of a circular shape coaxial with a longitudinal axis of symmetry of the containing body.

9. The capsule of claim 7, wherein the first opening profiles are radially arranged along a circumference coaxial with a longitudinal axis of symmetry of the containing body.

* * * * *